(12) United States Patent
Nam et al.

(10) Patent No.: US 11,764,932 B2
(45) Date of Patent: Sep. 19, 2023

(54) TIME-DEPENDENT ADAPTATION OF A WAKE-UP SIGNAL CONFIGURATION

(71) Applicant: QUALCOMM Incorporated, San Diego, CA (US)

(72) Inventors: Wooseok Nam, San Diego, CA (US); Olufunmilola Omolade Awoniyi-Oteri, San Diego, CA (US); Tao Luo, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/000,195

(22) Filed: Aug. 21, 2020

(65) Prior Publication Data

US 2021/0068055 A1 Mar. 4, 2021

Related U.S. Application Data

(60) Provisional application No. 62/894,475, filed on Aug. 30, 2019.

(51) Int. Cl.
*H04L 5/00* (2006.01)
*H04W 72/23* (2023.01)
(Continued)

(52) U.S. Cl.
CPC ........... *H04L 5/0053* (2013.01); *H04W 72/23* (2023.01); *H04L 5/0051* (2013.01); *H04L 5/10* (2013.01);
(Continued)

(58) Field of Classification Search
CPC ......... H04W 52/0229; H04W 52/0216; H04W 52/0219; H04W 76/28; H04W 72/0493;
(Continued)

(56) References Cited

U.S. PATENT DOCUMENTS

| 2020/0053647 A1* | 2/2020 | Chae ................. H04W 72/0446 |
| 2020/0107267 A1* | 4/2020 | Wu ..................... H04W 52/0229 |

(Continued)

FOREIGN PATENT DOCUMENTS

WO 2018199652 A1 11/2018

OTHER PUBLICATIONS

CATT: "Power Saving Signal/Channel Design and Performance", 3GPP Draft, 3GPP TSG RAN WG1 Meeting #98, R1-1908605, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, XP051765213, 19 Pages, Retrieved from the Internet: URL: http://www.3gpp.org/ftp/tsg_ran/WG1_RL1/TSGR1_98/Docs/R1-1908605.zip, [retrieved on Aug. 17, 2019], pp. 1-16, paragraph 2,paragraph 3.1, paragraph 3.2, figures 1.2.

(Continued)

*Primary Examiner* — Kevin C. Harper
(74) *Attorney, Agent, or Firm* — Procopio, Cory, Hargreaves & Savitch/Qualcomm incorporated

(57) ABSTRACT

A base station transmits an indication of a configuration indicating one or more time-variable parameters for a group-specific wake-up signal (WUS) to an associated group of user equipment (UEs). The base station determines a value of the one or more time-variable parameters based on a time associated with the group-specific WUS and transmits the group-specific WUS to the group of UEs based on the determined value. A UE in the group of UEs receives the indication of the configuration from the base station and determines a value of the one or more time-variable parameters based on a time associated with the group-specific WUS. The UE monitors for the group-specific WUS based on the determined value.

34 Claims, 12 Drawing Sheets

(51) Int. Cl.
  *H04W 52/02* (2009.01)
  *H04W 76/28* (2018.01)
  *H04L 5/10* (2006.01)
  *H04W 72/53* (2023.01)
(52) U.S. Cl.
  CPC .... *H04W 52/0216* (2013.01); *H04W 52/0219* (2013.01); *H04W 52/0229* (2013.01); *H04W 72/53* (2023.01); *H04W 76/28* (2018.02)
(58) Field of Classification Search
  CPC . H04W 72/042; H04W 72/23; H04W 72/231; H04W 72/232; H04L 5/10; H04L 5/0051; H04L 5/0053
  See application file for complete search history.

(56) References Cited

U.S. PATENT DOCUMENTS

2020/0351777 A1* 11/2020 Kim .................. H04L 5/0053
2021/0022077 A1* 1/2021 Mazloum ............ H04W 72/12
2021/0259044 A1* 8/2021 Islam ................ H04W 52/0229
2021/0360529 A1* 11/2021 Yang ................... H04W 72/042
2022/0182943 A1* 6/2022 Maleki ............... H04W 68/025

OTHER PUBLICATIONS

International Search Report and Written Opinion—PCT/US2020/047689—ISAEPO—daated Nov. 20, 2020.
Qualcomm Incorporated: "PDCCH-Based Power Saving Channel Design", 3GPP Draft, 3GPP TSG-RAN WG1 #98, R1-1909275 PDCCH-Based Power Saving Channel Design, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765880, pp. 1-11, Retrieved from Internet: URL: http://vww.3gpp.org/ftp/tsg_ran/WG1_RL1/TSGR1_98/Docs/R1-1909275.zip, [retrieved on Aug. 17, 2019], whole document.

* cited by examiner

TIME-DEPENDENT ADAPTATION OF A WAKE-UP SIGNAL CONFIGURATION

CROSS REFERENCE TO RELATED APPLICATION(S)

This application claims the benefit of U.S. Provisional Application Ser. No. 62/894,475, entitled "TIME-DEPENDENT ADAPTATION OF A WAKE-UP SIGNAL CONFIGURATION" and filed on Aug. 30, 2019, which is expressly incorporated by reference herein in its entirety.

BACKGROUND

Technical Field

The present disclosure relates generally to wireless communication systems, and more particularly, to adaptation of a wake-up signal configuration.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC).

Wireless communication may include a discontinuous reception mode. In the discontinuous reception mode, a user equipment (UE) may monitor for data discontinuously using a sleep and wake cycle to improve the UE's power efficiency. The UE may monitor for a wake-up signal (WUS) to determine whether to wake up for an on duration of the discontinuous reception mode. Improvements are presented herein for a WUS configuration. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus transmits an indication of a configuration for a group-specific wake-up signal (WUS) to an associated group of user equipment (UEs). The configuration indicates one or more time-variable parameters for the group-specific WUS. The apparatus determines a value of the one or more time-variable parameters based on a time associated with the group-specific WUS and transmits the group-specific WUS to the group of UEs based on the determined value.

In an aspect of the disclosure, a method, a computer-readable medium, and an apparatus are provided for wireless communication at a UE. The apparatus receives, from a base station, an indication of a configuration for a group-specific wake-up signal (WUS) associated with a group of UEs including the UE. The configuration indicates one or more time-variable parameters for the group-specific WUS. The apparatus determines a value of the one or more time-variable parameters based on a time associated with the group-specific WUS and monitors for the group-specific WUS based on the determined value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
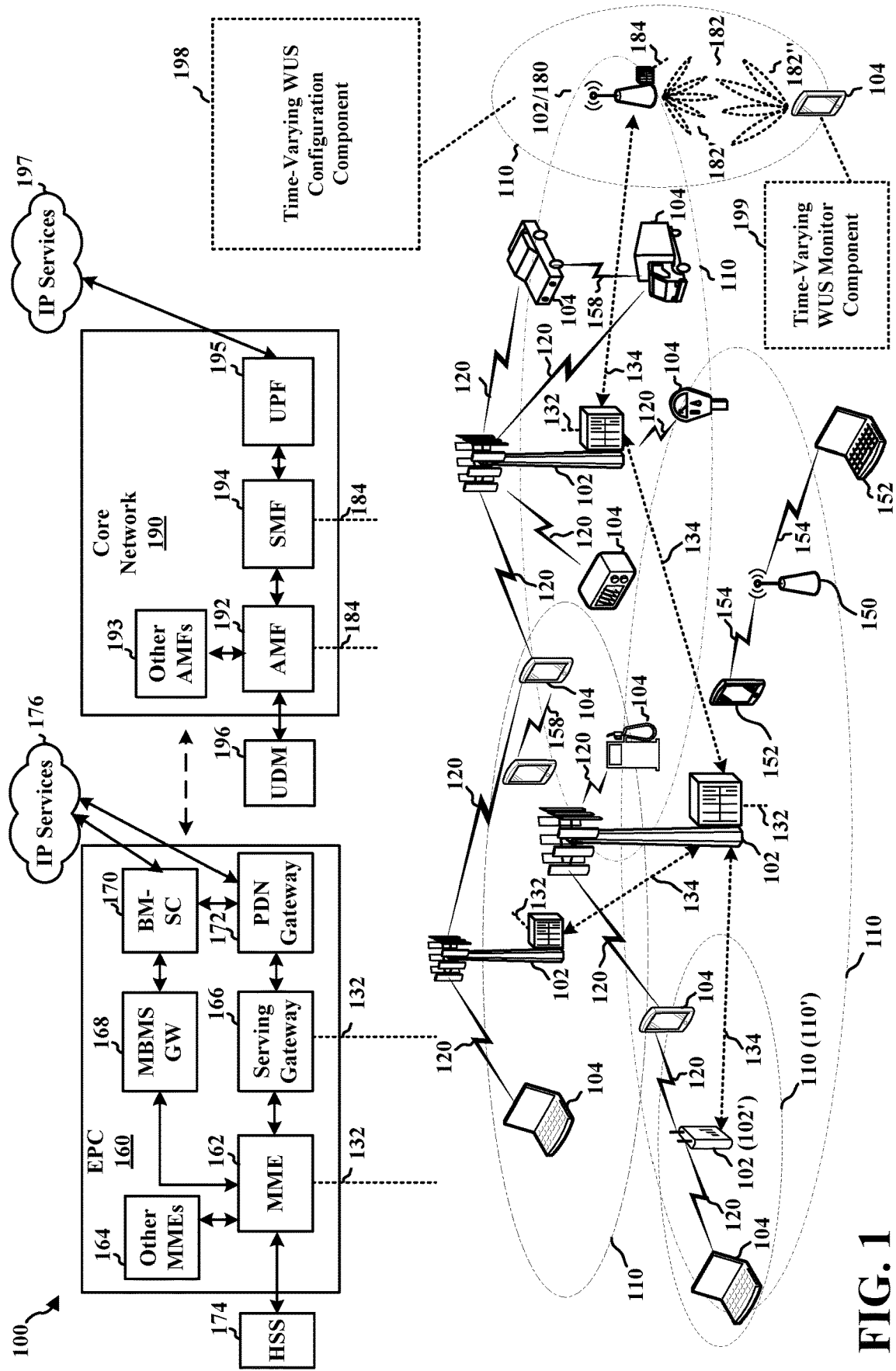
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those having ordinary skill in the art that these concepts may be practiced without these specific details. In some instances, structures and components are shown in block diagram form in order to avoid obscuring such concepts.

A UE may be configured by a base station for discontinuation reception (DRX). During an RRC connected state, when there is no data transmission in either direction (for example, in neither the uplink nor the downlink directions), the UE may operate using the DRX mode. In the DRX mode, the UE monitors for the PDCCH discontinuously using a sleep and wake cycle. As the UE is in an RRC connected mode, the DRX may also be referred to as Connected Mode DRX (C-DRX). Operating in the C-DRX mode conserves battery power at the UE as a result of the sleep and wake cycles.

A base station may configure a UE for a wake-up signal (WUS) in connection with C-DRX operation. The WUS may help improve the UE's power efficiency during C-DRX operation by enabling the UE to avoid waking up to monitor for a PDCCH during an on duration in which no PDCCH will be sent by the base station for the UE. To help save network resources, the base station may transmit a group-specific WUS to wake up a group of UEs. The group-specific WUS may enable the base station to transmit a single WUS rather than multiplexing a different WUS for each of the UEs. However, discontinuous reception (DRX) cycles for UEs in the group may have different lengths, and some UEs may change between operation based on a short DRX cycle and a long DRX cycle. It may be challenging for the base station to find a single WUS configuration that aligns a group-specific WUS for the group of UEs and that uses the base station's resources efficiently.

Aspects presented enable a group-specific WUS configuration to vary over time, such as over different WUS occasions. The use of time-varying parameters for a WUS configuration enables a base station to transmit a group-specific WUS to a group of UEs that have non-aligned WUS occasions. The use of time-varying parameters for a WUS configuration also enables a base station to transmit a group-specific WUS to a group of UEs that may change between a short DRX operation and a long DRX operation. In one example of a group-specific WUS configuration varying over time, the values of WUS configuration parameters may vary based on a WUS occasion. In another example of variation over time, different WUS configuration parameter values may be configured corresponding to the short or long DRX cycle length of the UEs. In another example, different UEs may be configured with different WUS configurations having different periodicities accommodating the DRX cycle lengths of the UEs. In some examples, the WU-DCI in different wake-up occasions may include different sizes, different content, or different locations of UE-specific fields based on time. In another example, a WU search space set configuration may vary based on time. In other examples, different WU-CORESET configurations, different amounts of frequency resources, different transmission configuration indication (TCI) states of the WU-CORESET (such as different beams), different DMRS mapping types, or different WU-BWP configurations may be used to transmit a WUS over different WUS occasions. In other examples, UEs may grouped with different UEs over time, or different wake-up offsets may be applied based on time.

Particular implementations of the subject matter described in this disclosure can be implemented to realize one or more of the following potential advantages. In some implementations, the described techniques provide a time-varying WUS configuration that enables a base station to transmit a single group-specific WUS to a group of UEs even when some of the respective WUS occasions are not aligned. Some implementations also enable the use of a single group-specific WUS to wake a group of UEs that are associated with, or that may switch between, short and long DRX cycles or other different modes of operation. The use of time-varying WUS configurations may also enable the base station to use the WUS resources more efficiently such as by grouping different types of UEs. For example, the base station may group UEs based on different DRX cycle lengths, such as UEs with short DRX cycle lengths and UEs with long DRX cycle lengths, among other examples, so that the base station may transmit a single group-specific WUS to the UEs of the respective type.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations 180, such as a gNB, may operate in a traditional sub 6 GHz spectrum, in millimeter wave (mmW) frequencies, or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (for example, 3 GHz-300 GHz) has extremely high path loss and a short range. Base stations/UEs may operate within one or more frequency range bands. The base station 180, such as a mmW base station, may utilize beamforming 182 with the UE 104 to compensate for the extremely high path loss and short range. The base station 180 and the UE 104 may each include multiple antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102 or 180 may transmit an indication of a configuration for a group-specific WUS to an associated group of UEs, the configuration indicating one or more time-variable parameters for the group-specific WUS. The base station 102 or 180 may include a time-varying WUS configuration component 198 configured to determine a value of the one or more time-variable parameters based on a time associated with the group-specific WUS. The base station 102 or 180 may transmit the group-specific WUS to the group of UEs based on the determined value.

In some aspects, the UE 104 may include a time-varying WUS monitor component 199 configured to receive, from a base station, an indication of a configuration for a group-specific WUS associated with a group of UEs including the UE, the configuration indicating one or more time-variable parameters for the group-specific WUS. The time-varying WUS monitor component 199 may be configured to determine a value of the one or more time-variable parameters based on a time associated with the group-specific WUS and to monitor for the group-specific WUS based on the determined value.

Although the following description may be described in connection with 5G NR, the concepts described herein may be applicable to other similar areas, such as LTE, LTE-A, CDMA, GSM, and other wireless technologies.

Figure 2:
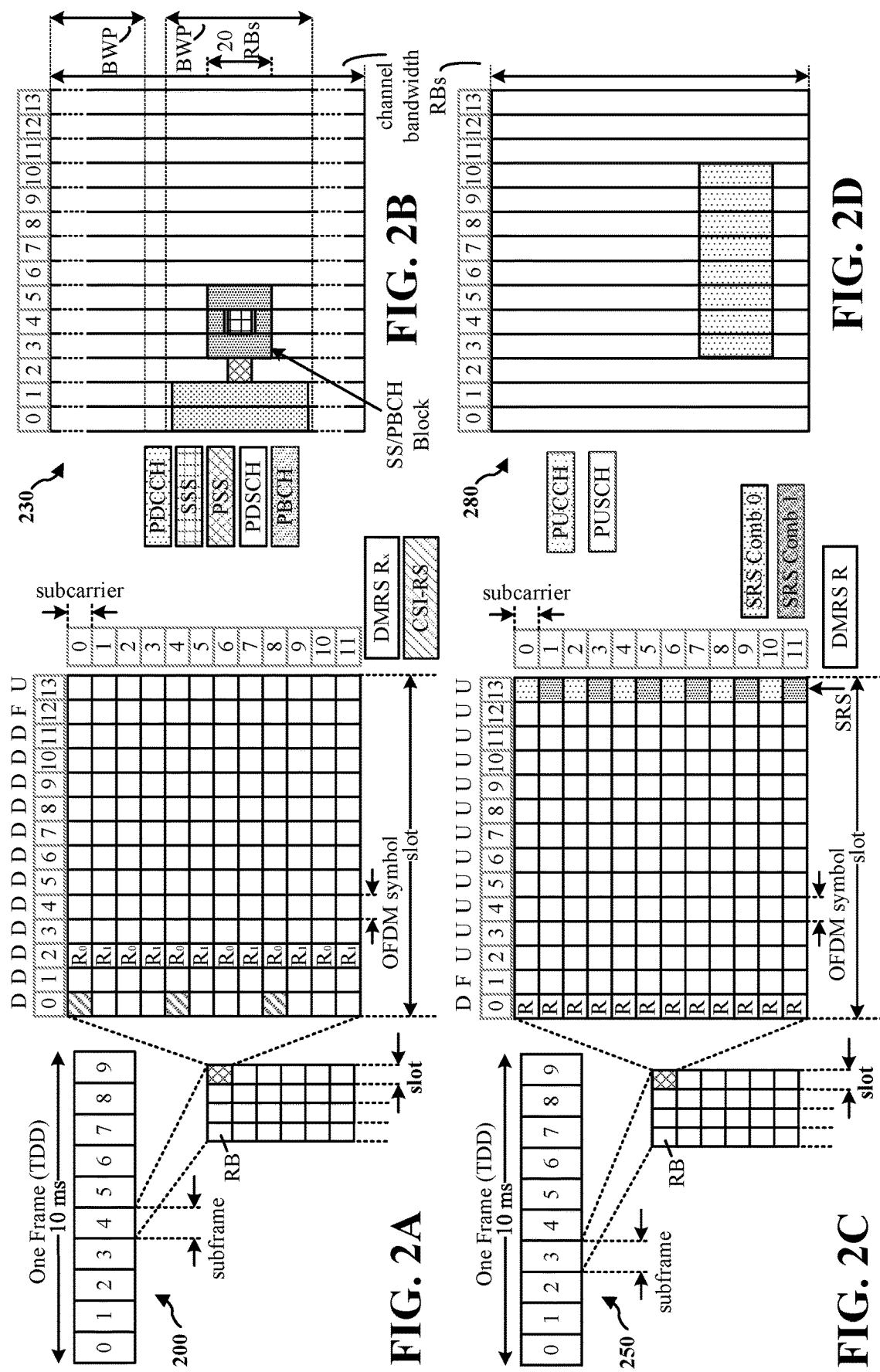
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), or UCI.

Figure 3:
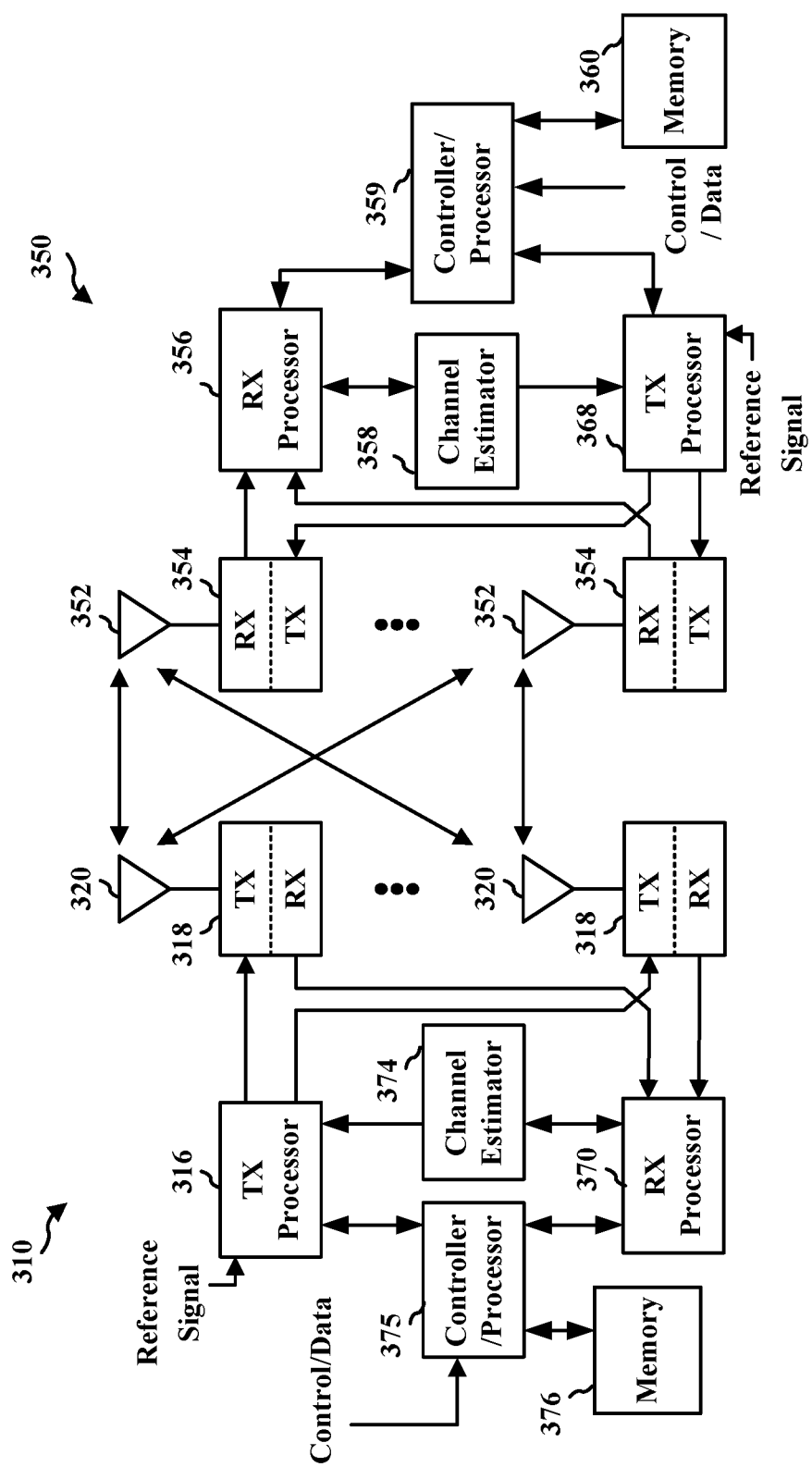
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 199 of FIG. 1. At least one of the TX processor 316, the RX processor 370, and the controller/processor 375 may be configured to perform aspects in connection with 198 of FIG. 1.

A UE may be configured by a base station for discontinuation reception (DRX). During an RRC connected state, when there is no data transmission in either direction (for example, in neither the uplink nor the downlink directions), the UE may operate using the DRX mode. In the DRX mode, the UE monitors for the PDCCH discontinuously using a sleep and wake cycle. As the UE is in an RRC connected mode, the DRX may also be referred to as Connected Mode DRX (C-DRX). Operating in the C-DRX mode conserves battery power at the UE as a result of the sleep and wake cycles. In contrast, in a non-DRX mode, the UE monitors for the PDCCH in each subframe to check whether there is downlink data available. Continuous monitoring of the PDCCH drains the UE's battery power.

The UE's DRX configuration may be configured by the network using RRC signaling from a base station, such as in an RRC Connection Setup request or an RRC connection reconfiguration request. A DRX configuration may include the configuration of one or more timers and values. In some examples, the DRX configuration may include one, some or all of an on duration timer, a DRX inactivity timer, a DRX retransmission timer, a DRX UL retransmission timer, a long DRX cycle, a value of the DRX start offset, a DRX short cycle timer, or a short DRX cycle, among other examples. A DRX cycle may comprise a periodic repetition of an "on" duration, in which the UE monitors for the PDCCH from the base station, and an "off" duration, in which the UE does not monitor for the PDCCH. The off duration may be referred to as a DRX opportunity. During the off duration, the UE may enter a sleep mode or a low power mode in which the UE minimizes power consumption by shutting down a radio frequency (RF) function without detecting communication from the base station.

The on duration timer may correspond to a number of consecutive PDCCH subframes to be monitored or decoded when the UE wakes up from the off duration in the DRX Cycle. The DRX retransmission timer may correspond to a consecutive number of PDCCH subframes for the UE to monitor when a retransmission is expected by the UE. The DRX inactivity timer may correspond to an amount of time before the UE may again enter the off duration following successfully decoding the PDCCH. The amount of time may be in terms of a transmission time interval (TTI) duration. After a UE successfully receives downlink data, the DRX inactivity timer may start counting a number of subframes. If any uplink or downlink data transmissions occur while the DRX inactivity timer is running, the timer restarts. If the DRX inactivity timer expires without uplink or downlink activity, the UE may enter the DRX cycle to achieve power savings. In some examples, the UE may start with a short DRX cycle. The DRX short cycle may correspond to a first DRX cycle that the UE enters after successful expiration of DRX inactivity timer. The UE may operate using the short DRX cycle until a DRX short cycle timer expires. Responsive to the expiration of the DRX short cycle timer, the UE may enter a long DRX cycle. In some examples, the DRX short cycle timer may correspond to a number of consecutive subframes during which the UE follows the short DRX cycle after the DRX inactivity timer has expired. The UE may further be able to transition to an idle mode DRX based on an RRC inactivity timer.

Figure 4:
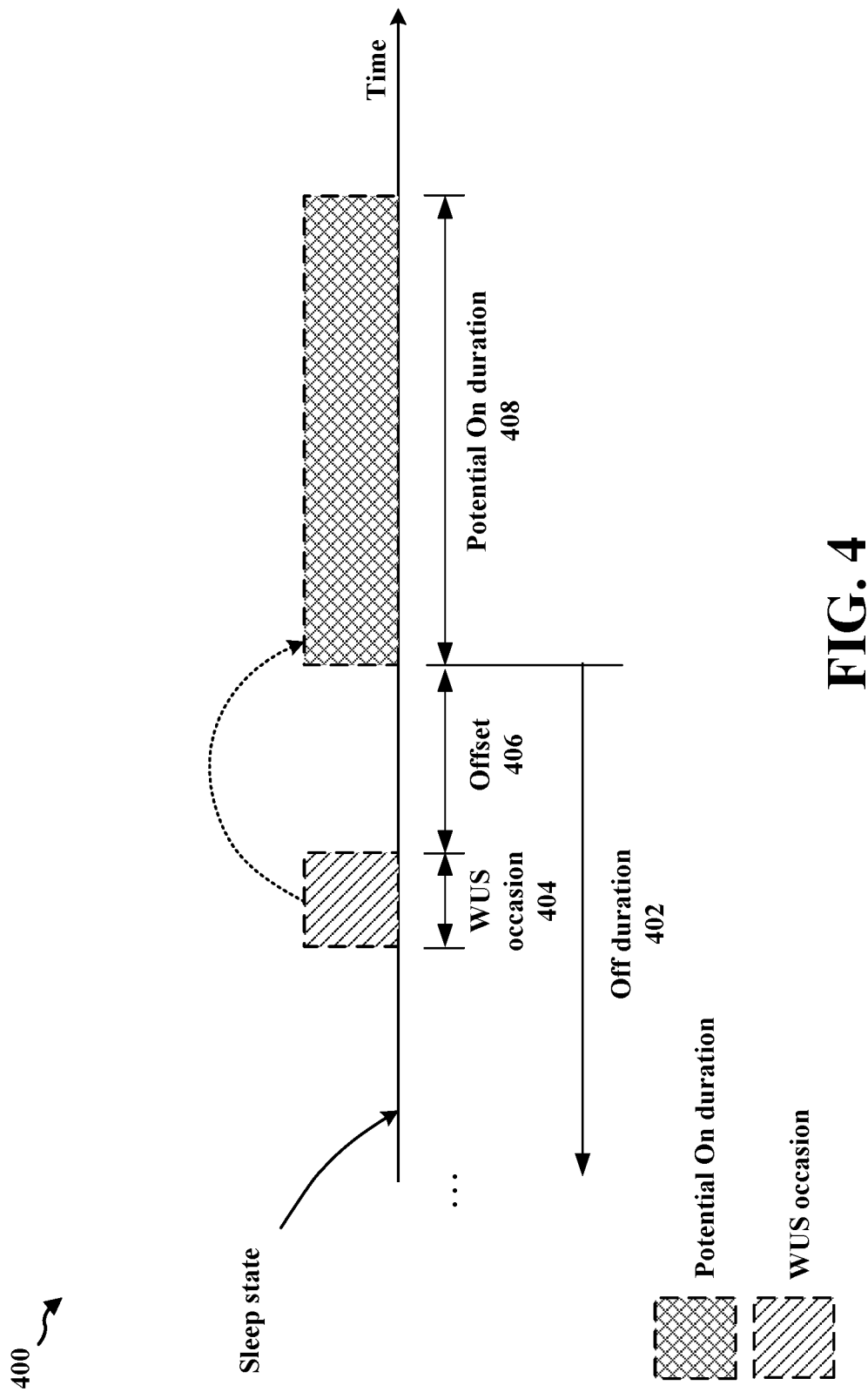
FIG. 4 illustrates an example discontinuous reception (DRX) timeline including a wake-up signal (WUS).

A base station may configure a UE for a wake-up signal in connection with C-DRX operation. The WUS may help improve the UE's power efficiency during C-DRX operation by enabling the UE to avoid waking up to monitor for a PDCCH during an on duration in which no PDCCH will be sent by the base station for the UE. FIG. 4 illustrates an example DRX timeline 400 including a WUS. The UE may remain in a sleep state during an off duration 402. The UE may monitor for a WUS from the base station during a WUS occasion 404. If the UE receives the WUS from the base station, the UE wakes up to monitor for a communication from the base station during the on duration 408. For example, the UE may monitor for a PDCCH from the base station during the on duration 408 in response to the UE detecting the corresponding WUS from the base station. If the UE does not detect a WUS during the WUS occasion 404, the UE may skip the corresponding on duration 408 and may remain in the sleep mode enabling the UE to achieve greater power savings.

The WUS occasion 404 may be spaced from the on duration by an offset 406. The WUS may be based on a PDCCH, and may be referred to as a PDCCH-WUS. The UE may receive a configuration for the PDCCH-WUS. The configuration may include a wake-up bandwidth part (WU-BWP) for the UE to use in monitoring for the WUS during the WUS occasion 404. The configuration may include a wake-up control resource set (WU-CORESET) configuration for the UE to use in monitoring for the WUS. The configuration may include one or more dedicated search space sets for WUS occasions including the WUS occasion 404. The one or more dedicated search space sets may be referred to as WU search space sets. The configuration may include a wake-up downlink control information (WU-DCI) configuration of the WUS. The WU-DCI may be scrambled with a cyclic redundancy check (CRC) using a power saving radio network temporary identifier (PS-RNTI). The UE may receive the PS-RNTI in the configuration from the base station. Multiple UEs may monitor for the same PDCCH-WUS. The PDCCH-WUS may include an indicator field for each of the multiple UEs that individually indicates whether a particular UE should wake-up to receive the communication from the base station during the on duration 408.

Figure 5:
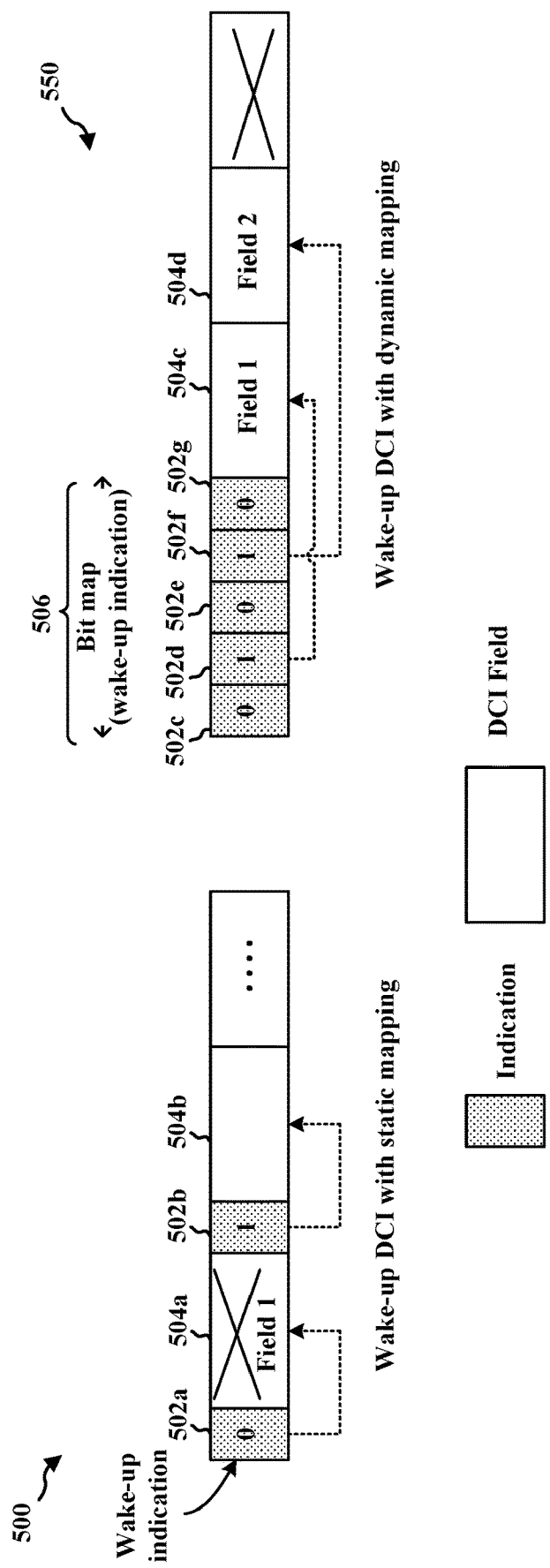
FIG. 5 illustrates example wake-up downlink control information (WU-DCI) formats for transmitting a WUS to multiple UEs in accordance with some aspects of the present disclosure.

FIG. 5 illustrates example WU-DCI formats 500 and 550 for transmitting a WUS to multiple UEs. The WU-DCI format 500 includes wake-up indicator fields 502 and DCI fields 504, including a wake-up indicator field 502a for a first UE followed by a DCI field 504a for the first UE, and a wake-up indicator field 502b for a second UE followed by a DCI field 504b for the second UE, and so forth, such that the WU-DCI includes a wake-up indicator field and corresponding DCI field for each of the multiple UEs attempting to detect the WUS. In some examples, the WU-DCI format 500 includes a static mapping of the wake-up indicator fields and the DCI fields for each of the multiple UEs configured for the WUS, including UEs for which the base station does not have control information.

The wake-up indicator fields 502 may each include a bit that indicates whether the corresponding DCI field 504 includes information for the respective UE. In the illustrated example, the value of the wake-up indicator field 502a is "0" indicating that there is no information for the first UE in the DCI field 504a. In some such examples, the DCI field 504a may be empty. The "0" in the wake-up indicator field 502a and the empty DCI field 504a indicate to the UE that the base station does not have a communication for the first UE. As such, the UE may remain in the sleep mode during the subsequent on duration. In the illustrated example, the value of the wake-up indicator field 502b is "1" indicating to the second UE that the corresponding DCI field 504b includes control information for the second UE.

The DCI field 504b may include information for the second UE to use to monitor for a PDCCH during the subsequent on duration. For example, the DCI field 504b may include control information informing the second UE that the network wants it to monitor for a reference signal. For example, the control information in the DCI field 504b may trigger aperiodic CSI-RS (A-CSI-RS) monitoring by the second UE. The control information in the DCI field 504b may indicate a change for the PDCCH monitoring by the second UE during the on duration. For example, the network may indicate to the second UE to reduce PDCCH monitoring during the on duration. The control information in the DCI field 504b may include bandwidth part (BWP) switching information for the UE. For example, the BWP switching information may change a BWP that the second UE uses to monitor for the PDCCH from the base station during the on duration. The control information in the DCI field 504b may additionally or alternatively include wake-up information for a secondary cell (SCell) group for the second UE. The second UE may use the wake-up information to monitor for the PDCCH from the SCell during the on duration.

As an alternative to the static mapping of the WU-DCI format 500, the WU-DCI format 550 includes a bit map 506 having wake-up indicators, including wake-up indicators 502c, 502d, 502e, 502f, and 502g, for the respective UEs configured to monitor the WUS, followed by DCI fields, including DCI fields 504c and 504d, corresponding to respective ones of the wake-up indicators 502. In some examples, each of the wake-up indicators is a single bit indicating to the respective UE whether the WU-DCI includes a DCI field for the UE. For example, if the value of a bit is "1," as in wake-up indicators 502d and 502f, this may indicate to the corresponding UE that the WU-DCI includes a DCI field with information for the UE. In contrast, if the value of a bit is "0," as in wake-up indicators 502c, 502e and 502g, this may indicate to the corresponding UE that the WU-DCI does not include a DCI field with information for the UE.

The UE that monitors wake-up indicator 502d in the bit map 506 may determine that the first DCI field 504c comprises control information for it, because wake-up indicator 502d is the first indicator in the bit map 506 that includes a "1." Likewise, the UE that monitors wake-up indicator 502f in the bit map 506 may determine that the second DCI field 504d comprises control information for it, because wake-up indicator 502f is the second indicator in the bit map 506 that includes a "1." The dynamic mapping of the WU-DCI format 550 may include fewer DCI fields than the number of UEs configured to monitor the WUS, because the WU-DCI format 550 may not include a DCI field 504 corresponding to wake-up indicators 502c, 502e, or 502g.

A group-specific PDCCH-WUS may enable the network to save resources by combining control information for multiple UEs into a shared PDCCH-WUS. In order to send a WUS to wake-up multiple UEs, the base station may send a single group-specific PDCCH-WUS, such as one of the WU-DCIs illustrated in FIG. 5, instead of multiplexing PDCCH-WUSs for each of the UEs. In some examples, the DRX configuration for each UE may depend on the UE's traffic state. In some examples, the UE's DRX configuration may include an indication of a DRX cycle, a length of the on duration, and an inactivity timer, among other parameters. In some instances, a first UE may have a DRX cycle that is an integer multiple of a DRX cycle for another UE in the group of UEs. As such, the WUS occasions for the first UE may not be aligned with the other UE.

Figure 6:
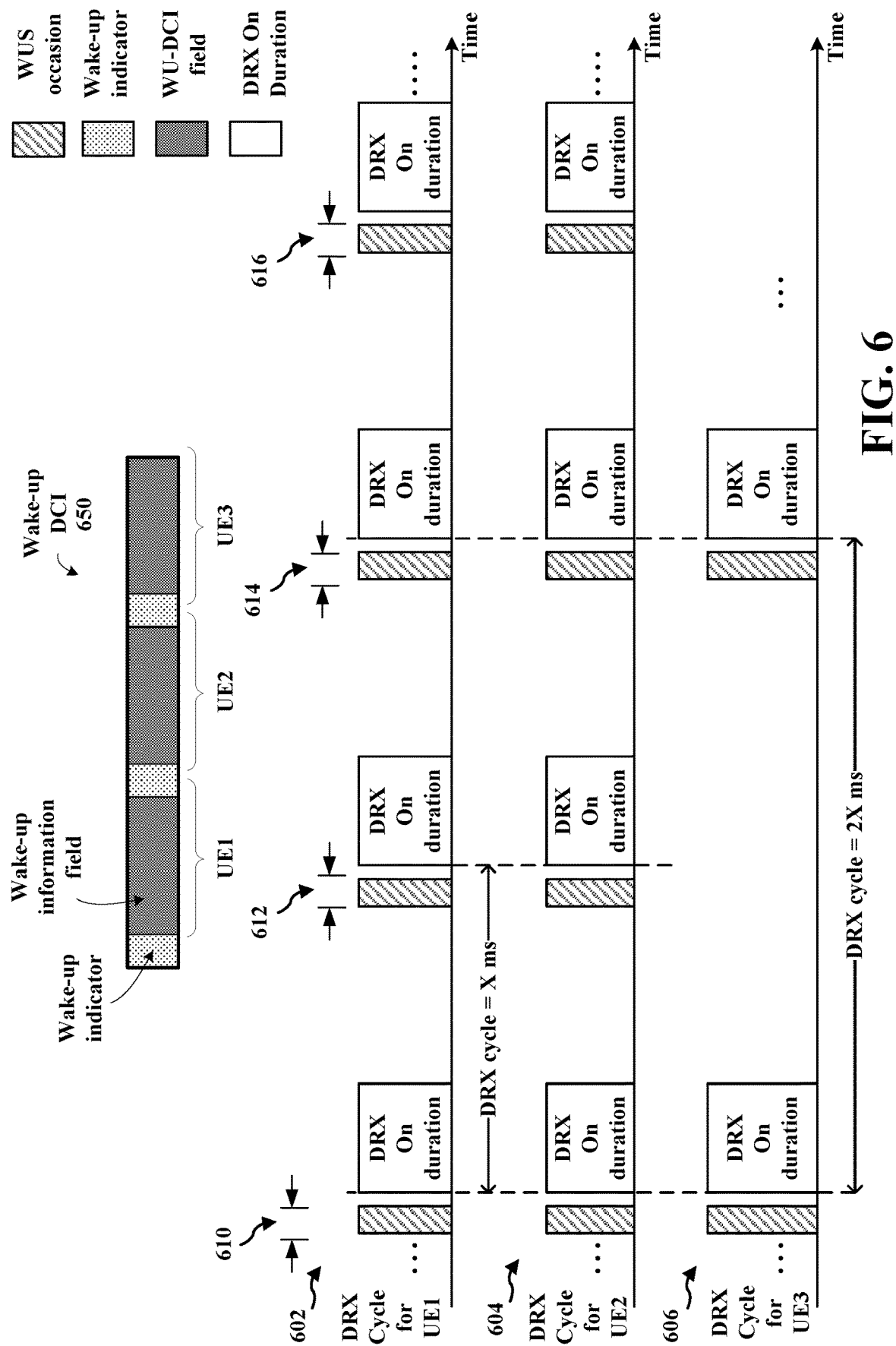
FIG. 6 illustrates an example of DRX timelines for a group of UEs having non-aligned WUS occasions.

FIG. 6 illustrates an example of DRX cycles, including DRX cycle 602 for UE1, DRX cycle 604 for UE2, and DRX cycle 606 for UE3, for a group of UEs having non-aligned WUS occasions. The DRX cycle 602 for the UE1 and the DRX cycle 604 for the UE2 have a length of X ms, whereas the DRX cycle for the UE3 has a longer length of 2X ms. Each of the UEs (including UE1, UE2, and UE3) may share a group-specific WUS. For example, each of the UEs may have a WUS configuration with a same wake-up BWP (WU-BWP), a same wake-up control resource set (WU-CORESET), and a same wake-up downlink control information (WU-DCI) configuration, such as WU-DCI format 500 or 550 in FIG. 5. However, due to the difference in the DRX cycles 602, 604, and 606, a wake-up (WU) search space set configuration, which determines the periodicity of WUS monitoring occasions, is different for the UE3 than for the UE1 and the UE2. For example, in the even-index WUS occasions 610 and 614, all three UEs (UE1, UE2, and UE3) may monitor for PDCCH-WUS, while in the odd-index WUS occasions 612 and 616, only UE1 and UE2 may monitor for PDCCH-WUS. Therefore, UE1 and the UE2 have the WUS occasions 612 and 616 that are not aligned with the UE3. A base station may configure a group-specific WUS for the three UEs using a static mapping, such as illustrated for group WU-DCI format 650 that includes a wake-up indicator field and a wake-up information field for each of the UEs. However, UE3 is not configured to monitor for a group WUS in the WUS occasions 612 and 616. Therefore, during WUS occasions 612 and 616, the resources of the DCI for the group-specific WUS for UE3 are wasted.

Alternatively or additionally, a UE in the group of UEs may be configured for a short DRX cycle and a long DRX cycle. The UE may switch between the short DRX cycle and the long DRX cycle in order to adapt to traffic. One or more other UEs in the group may be configured with a long DRX cycle without being configured for a short DRX cycle.

Figure 7:
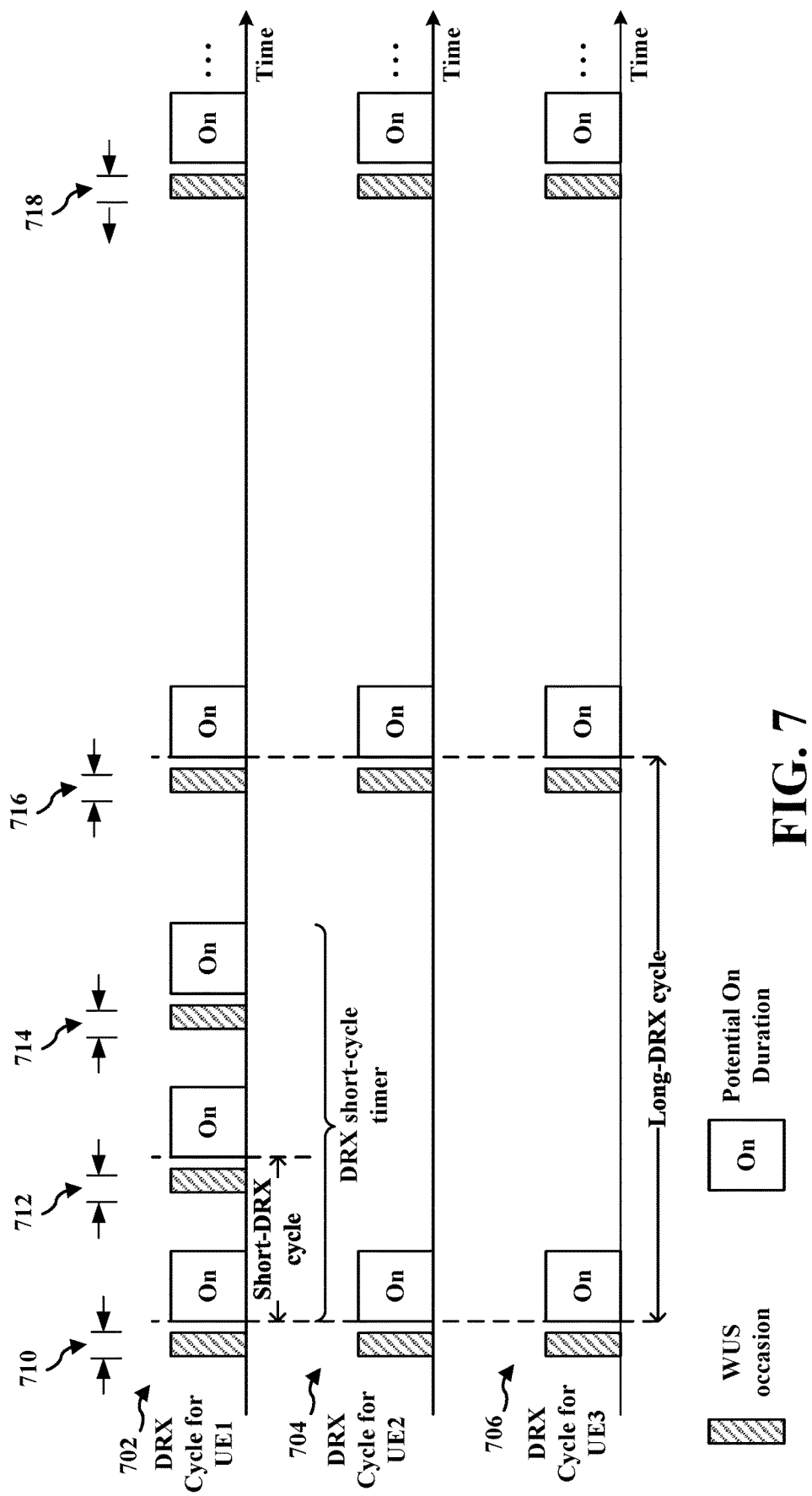
FIG. 7 illustrates an example of DRX timelines for a group of UEs including a UE that changes between operation using a short DRX cycle and a long DRX cycle.

FIG. 7 illustrates an example of DRX timelines for a group of UEs including a UE1 that changes between operation using a short DRX cycle and a long DRX cycle. FIG. 7 includes a DRX cycle 702 for the UE1, a DRX cycle 704 for the UE2, and a DRX cycle 706 for the UE3. Similar to the example described in connection with FIG. 6, the three UEs may share a group-specific WUS. In FIG. 7, the UE1 is configured for a short DRX operation, and changes from operation using the short DRX cycle to operation using a long DRX cycle. The DRX short cycle timer may correspond to 3 cycles for the UE1. In response to a trigger for the short DRX operation, the UE1 monitors for a WUS using a shorter periodicity. If the DRX short cycle timer expires (for example, if three short DRX cycles pass without the UE receiving any scheduled communication), the UE1 may switch from using the short DRX cycle to using the long DRX cycle. The UE2 or the UE3 may not be configured for operation using a short DRX cycle. Alternatively, the UE2 or the UE3 may not receive any communication that triggers operation using a short DRX cycle. At least some of the WUS occasions for the three UEs may align, such as WUS occasion 710, 716, and 718. If the UE1 shares a group-specific WU-DCI configuration with the UE2 and the UE3, the UE1 may monitor the WU-DCI formatted for the three UEs, even during the WUS occasions for short DRX cycles. For example, if the UE1 in FIG. 7 is configured for a static group WUS DCI format 650, the UE may monitor for a WUS using the same DCI format (for example a DCI format including DCI fields for the UE2 and the UE3) even during the WUS occasions 712 and 714. The UE2 and the UE3 do not have a corresponding WUS occasion that aligns with the WUS occasions 712 and 714. Therefore, the DCI fields for the UE2 and the UE3 may be wasted for the WUS occasions 712 and 714.

It may be challenging for the base station to find a single configuration that aligns WUS occasions among a group of UEs and that uses the base station's resources efficiently. In order to address this challenge, aspects described in the present application enable a WUS configuration to vary over time, such as over different WUS occasions.

Aspects disclosed herein enable a time-varying configuration for a WUS. Over different WUS occasions, one or more parameters of WUS configuration may be different. Various implementations relate generally to configurations for a group-specific WUS including one or more time-varying parameters. A base station may determine a value for each of the one or more time-varying parameters based on time and may use the determined values to transmit a group WUS to a group of UEs. A UE may receive a configuration from the base station including one or more time-varying parameters for at least one group WUS. The UE may determine a value for each of the time-varying parameters based on time associated with a particular WUS occasion and may use the determined values to monitor for a group WUS from the base station during the particular WUS occasion.

The use of time-varying parameters for a WUS configuration enables a base station to transmit a group-specific WUS to a group of UEs that have non-aligned WUS occasions, such as described in connection with FIG. 6. The use of time-varying parameters for a WUS configuration also enables a base station to transmit a group-specific WUS to a group of UEs that includes a UE that may change between a short DRX operation and a long DRX operation, such as described in connection with FIG. 7.

In some examples, the values of the one or more WUS configuration parameters may vary based on a WUS occasion. For example, the base station may use a first WUS configuration at the WUS occasion 710 in FIG. 7, and a second WUS configuration at the WUS occasions 712 and 714. In some examples, the WUS configuration may vary based on a system frame number. In some examples, the WUS configuration may vary based on a slot index. In some examples, the WUS configuration may vary based on another unit of time than a WUS occasion, a system frame number, or a slot index. The time-varying parameters for the WUS may relate, for example, to any of a WU-BWP, a WU-CORESET, a WU search space set, or a WU-DCI, among other examples.

The base station may configure a variable WUS configuration for a specific UE. In some examples, instead of configuring a single value for each of the WUS configuration parameters for a UE, the base station may provide the UE with a sequence of values for the WUS configuration parameters. As one example, the base station may configure the UE1 or the UE2 in FIG. 7 with WUS configuration parameter values corresponding to a short DRX cycle and different parameter values corresponding to a long DRX cycle. The UE1 or the UE2 may determine the values of the WUS configuration parameters to use in monitoring for a WUS based on whether the UE is operating using the short DRX cycle or the long DRX cycle.

In another example, the base station may configure the UE with a sequence of parameters based on a WUS occasion, a system frame number, a slot index, etc. For example, the UE1 and the UE2 in FIG. 6 may apply a first set of parameters in the sequence for the WUS occasions 610 and 614 and may apply a second set of parameters in the sequence for the WUS occasions 612 and 616. The UE3 may be configured with a single set of parameters, which the UE3 may use to monitor for a group-specific WUS in the WUS occasions 610 and 614.

In some aspects, rather than configuring a UE with a sequence of WUS parameters, a base station may configure the UE with more than one WUS configuration. For example, the base station may configure the UE with a first WUS configuration having a first periodicity or a first offset configuration. The base station may configure the UE with a second WUS configuration having a second periodicity or a second offset configuration. The UE may use the two WUS configurations (for example having the different periodicity/offset configuration) to monitor for a WUS from the base station. The base station may configure the UE1, the UE2, and the UE3 in FIG. 6 with a first WUS configuration having a periodicity that is based on the longer DRX cycle of the UE3 (such as 2X ms). The base station may configure the UE1 and the UE2 with a second WUS configuration to accommodate the shorter DRX cycle (such as X ms) of the UEs. The second WUS configuration may also be based on a 2X ms DRX cycle length, yet may be spaced to occur during the WUS occasions 612 and 616 that fall between the WUS occasions 610 and 614 that are shared with the UE3.

Figure 8:
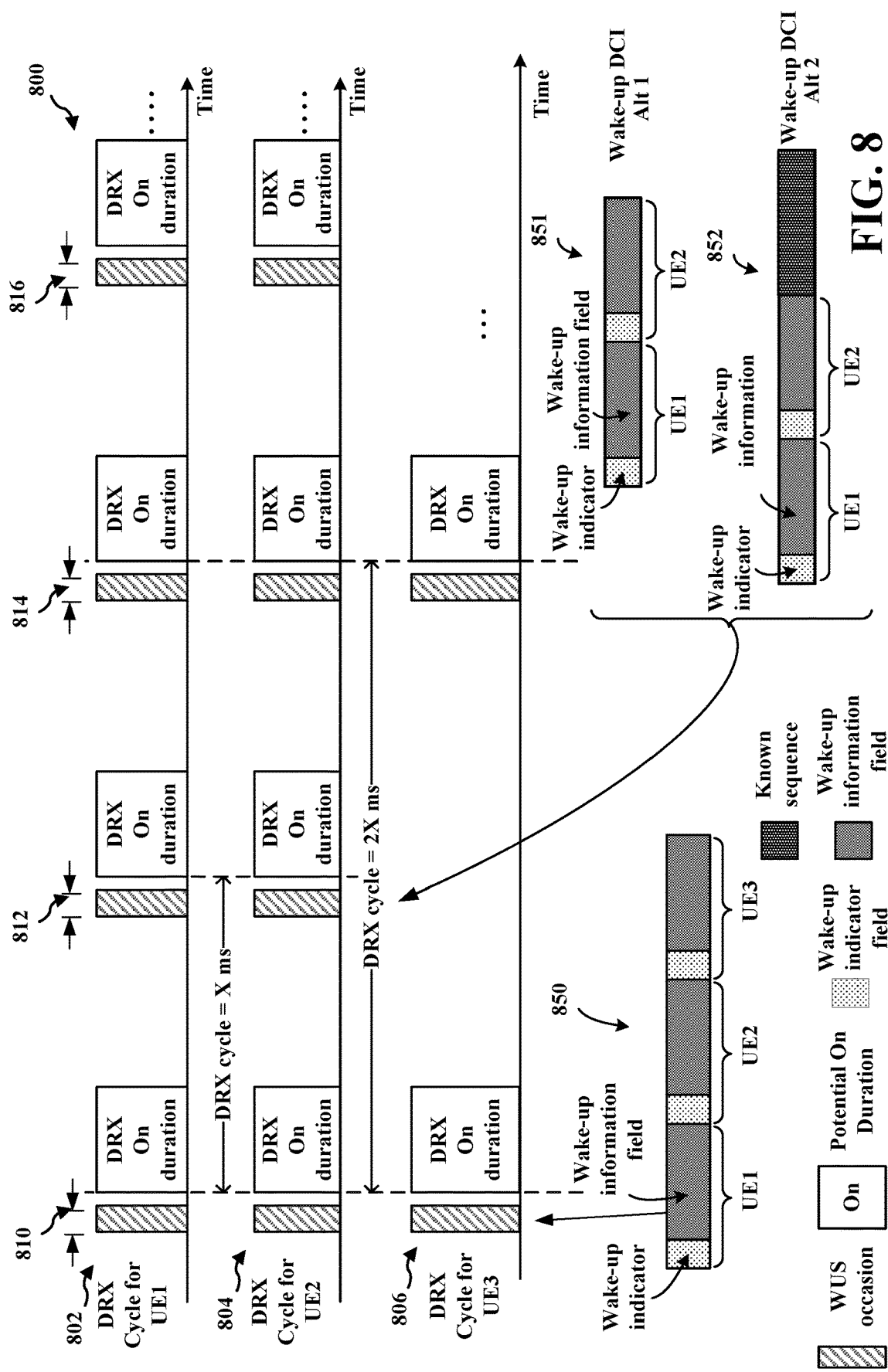
FIG. 8 illustrates example aspects for WU-DCI based on time-variable parameters to accommodate a group of UEs having non-aligned WUS occasions in accordance with some aspects of the present disclosure.

FIG. 8 illustrates example aspects for a WU-DCI configuration based on time-variable parameters that accommodate a group of UEs having non-aligned WUS occasions. FIG. 8 illustrates a DRX cycle 802 for the UE1, a DRX cycle 804 for UE2, and a DRX cycle 806 for the UE3. The UE1 and the UE2 have a shorter DRX cycle (for example, X ms) than the DRX cycle 806 of UE3 (for example 2X ms). The size of a WU-DCI configuration for a group-specific WUS may vary over different WUS occasions. For example, at the WUS occasions 810 and 814, the base station may use the WU-DCI format 850 that includes a wake-up indicator and wake-up information field for each of the UE1, the UE2, and the UE3. In other WUS occasions, the base station may use a different size of the WU-DCI. For example, the base station may reduce the size of the WU-DCI in the WUS occasions 812 and 816, because the UE3 does not have a WUS occasion that aligns with the WUS occasions 812 and 816. The base station may use the WU-DCI format 851 that includes a wake-up indicator field and a wake-up information field for UE1 and UE2, but does not include a DCI field for UE3. Alternatively, or additionally, the fields within the WU-DCI may change over time. As an example, rather than reducing the size of the WU-DCI by removing the DCI fields (such as one or more of the wake-up indicator field or the wake-up information field) for the UE3, the base station may reuse a DCI field for the UE3 to transmit a known sequence, as illustrated in WU-DCI format 852. The UE1 and the UE2 may use the known sequence to help to decode the wake-up information in their respective WU-DCI fields. Therefore, the WU-DCI field for the UE3 may be used to improve decoding performance for the UE1 and the UE2 at times when the UE3 will not be monitoring for a WUS (such as the WUS occasions 812 and 816).

Various different WUS configuration parameters may be time-variable. In some examples, the WU-DCI size for a group-specific WUS may vary based on time, as described in connection with FIG. 8. The WU-DCI content for a group-specific WUS may vary over different WUS occasions. In some examples, the base station may transmit a known sequence in a WU-DCI field during some of the WUS occasions, as described in connection with the WU-DCI format 852 in FIG. 8. In other examples, the WU-DCI in different wake-up occasions may include different content to trigger power savings at a UE following wake-up. In some examples, during different WUS occasions, the base station may include different DCI content in a WU-DCI for a UE regarding any of BWP switching, an aperiodic channel state information (A-CSI) request, or a PDCCH adaptation, among other examples.

In some examples, a location of a UE specific field (such as a wake-up indicator field or a wake-up information field) within a WU-DCI of a group-specific WUS may change based on time. In some WUS occasions, the base station may add an additional UE or may shorten the WU-DCI by removing a field for a UE. Therefore, a relative position of WU-DCI field for a particular UE may change within the WU-DCI based on the time. As an example, if the WU-DCI format 851 is shortened to remove the DCI field for the UE2, the base station may transmit WU-DCI information for the UE3 in a second wake-up information field rather than a third wake-up information field.

In some examples, a WU search space set configuration may vary based on time. The base station may use a different aggregation level or a different number of DCI candidates to transmit a WUS during different WUS occasions. The base station may transmit the WUS in different locations within a slot over different WUS occasions. The UE may monitor for a group-specific WUS at different monitoring occasion locations within a slot or may monitor for different monitoring durations in a slot at different WUS occasions.

In some examples, the base station may use a different WU-CORESET configuration to transmit a WUS to UE(s) over different WUS occasions. For example, the base station may use different frequency resources within a BWP (such as a WU-BWP) to transmit the WUS to a UE over different WUS occasions. A UE may similarly monitor different frequency resources within a WU-BWP over different WUS occasions of the UE. The base station may use a larger amount of frequency resources to transmit a group-specific WUS to a larger number of UEs and may use a smaller amount of frequency resources to transmit a WUS to a subset of UEs from the group. A base station may use different transmission configuration indication (TCI) states of WU-CORESET (such as different beams) to transmit a WUS to a UE over different WUS occasions. Likewise, the UE may use different beams to monitor for a group-specific WUS from the base station over different WUS occasions. In some examples, the base station may use a first beam to transmit a group-specific WUS to the UE1, the UE2, and the UE3 at the WUS occasion 810. The base station may use a different beam to transmit a WUS to the UE1 and the UE2 during WUS occasion 816. The second beam may be a more effective beam for the UE1 and the UE2, but may not be a good beam for the UE3. The base station may use a different demodulation reference signal (DMRS) mapping to transmit a WUS to a UE over different WUS occasions. The base station may use a different DMRS mapping type (such as a narrowband DMRS or a wide-band DMRS) based on a time at which the WUS will be transmitted to the UE.

In some examples, the base station may use a different WU-BWP configuration to transmit a group-specific WUS over different WUS occasions. Likewise, a UE may monitor for a group-specific WUS from the base station using a different WU-BWP configuration over different WUS occasions monitored by the UE. For example, the UE1 may use a different frequency allocation for a BWP for monitoring for a WUS during WUS occasion 810 than during WUS occasion 812.

In some examples, the base station may group a UE with different UEs over time. For example, the UE1 in FIG. 8 may be grouped with UE2 and UE3 for WUS occasions 810 and 814. For WUS occasions 812 and 816, the UE1 may be grouped with UE2. Each group may be associated with a group-specific radio network temporary identifier (RNTI) (such as a power saving radio network temporary identifier (PS-RNTI). The base station may provide each of the RNTIs to the UE, and the UE may use a corresponding RNTI to monitor for a WUS from the base station at a particular WUS occasion. The base station may scramble the DCI comprised in the WUS with the corresponding RNTI for the group.

In some examples, the base station may apply a different wake-up offset between a WUS occasion and an on duration based on time. Over different wake-up occasions, the base station may use a different wake-up offset to transmit a group-specific WUS to a group of UEs. Likewise, a UE within the group of UEs may use a different wake-up offset to monitor for a group-specific WUS from the base station over different WUS occasions.

Figure 9:
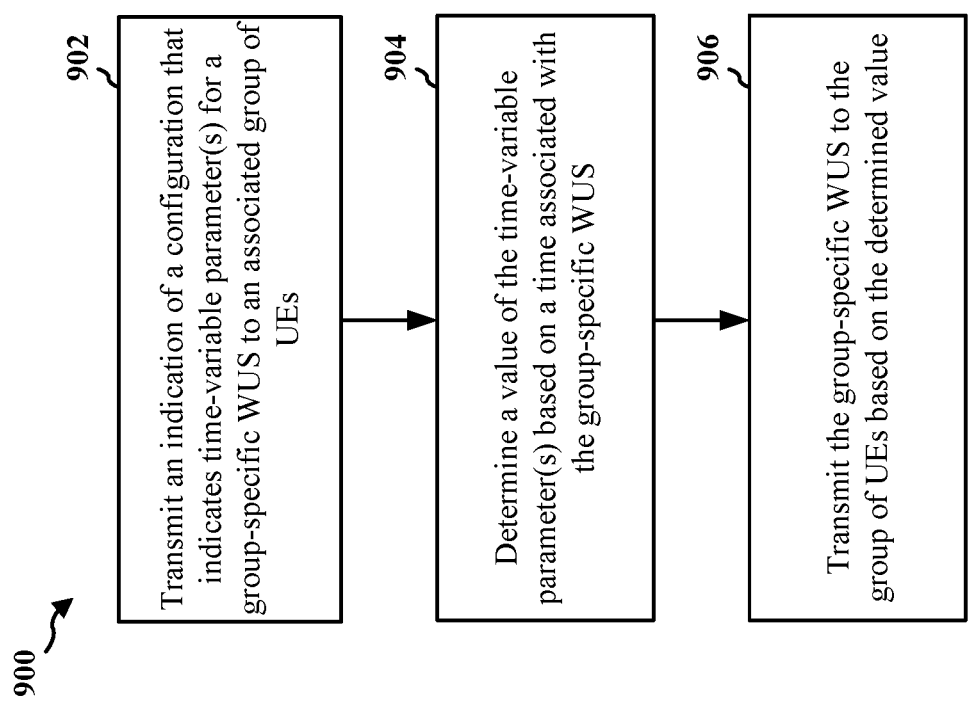
FIG. 9 is a flowchart illustrating a method of wireless communication that supports time-variable WUS parameters in accordance with some aspects of the present disclosure.

FIG. 9 is a flowchart 900 of a method of wireless communication. The method may be performed by a base station or a component of a base station (such as the base station 102, 180, 310; the apparatus 1002, which may include the memory 376 and which may be the entire base station 310 or a component of the base station 310, such as the TX processor 316, the RX processor 370, or the controller/processor 375). The method may enable a base station to send a group-specific WUS to multiple UEs, even if the group of UEs have different DRX configurations.

At 902, the base station may transmit an indication of a configuration for a group-specific WUS to an associated group of UEs, the configuration indicating one or more time-variable parameters for the group-specific WUS. The configuration indication may be performed, for example, by the configuration component 1008 of the apparatus 1002. For example, referring to the Figures, the base station 102, 310 may transmit an indication of a configuration for a WU-DCI (such as one of the WU-DCI formats 500, 550, 650, 850, 851, 852) to an associated group of UEs 104, 350. The configuration may indicate one or more time-variable parameters for the WU-DCI, including any of a WU-DCI size (such as a number of DCI fields in the WU-DCI among other examples), a WU-DCI content in a DCI field (such as BWP switching information, an A-CSI request, a PDCCH monitoring adaptation, among other examples), a location of a UE-specific field within the WU-DCI, a WU-BWP configuration (such as a frequency allocation for a BWP including the WU-DCI among other examples), a WU-CORESET configuration (such as frequency resources within a BWP including the WU-DCI), a TCI state for a WU-CORESET (such as indicating beams for the WU-DCI transmission among other examples), a DMRS mapping type (such as a narrowband DMRS or a wideband DMRS associated with the WU-DCI), a wake-up search space configuration (such as an aggregation level of the WU-DCI and a number of candidates, a monitoring occasion location within a slot for the WU-DCI, a monitoring duration in a slot for the WU-DCI, among other examples), a UE group (such as a value of a group-specific RNTI, a PS-RNTI, among other examples), or a wake-up offset value for the wake-up offset between a WUS occasion and an on duration of the UE.

The configuration may indicate a sequence of time-variable parameters for at least one UE from the group of UEs. For example, the base station may configure a UE with WUS parameters to be applied with the UE is operating using a short cycle and WUS parameters to be applied if the UE in operating using a long DRX cycle. The sequence may include a first time-variable parameter associated with a shorter DRX cycle length of the at least one UE and a second time-variable parameter associated with a longer DRX cycle length of the at least one UE. For example, referring to the Figures, the configuration of the WU-DCI format 500, 550, 650, 850, 851, 852 for at least one UE 104, 350 may indicate a sequence of different WU-DCI sizes for the WU-DCI, including a first WU-DCI size associated with shorter DRX cycle lengths and a second WU-DCI size associated with longer DRX cycle lengths. For instance, referring to FIG. 8, the configuration may indicate a sequence of DCI sizes: (2, 3), corresponding to DCI format 851 with two DCI fields for 2X ms (longer) DRX cycles and DCI format 850 with three DCI fields for X ms (shorter) DRX cycles. Accordingly in this example, the WU-DCI may include two DCI fields for shorter cycles and three fields for longer cycles. In other examples, the configuration may indicate a sequence of different WU-DCI contents, UE-specific field locations, or other time-variable parameters depending on DRX cycle length. Thus, the base station may configure a UE to use different WUS parameters for different WUS occasions.

Additionally or alternatively, the configuration may include a first WUS configuration and a second WUS configuration for at least one UE from the group of UEs, the first WUS configuration having at least one of a first periodicity or a first offset parameter and the second WUS configuration having at least one of a second periodicity or a second offset parameter different than the first periodicity or the first offset parameter, respectively. For example, the base station may configure a UE operating using a short DRX cycle with a first WUS configuration for WUS occasions that may align with the DRX occasion of at least some of the other UEs, such as UEs having a long DRX cycle, and a second WUS configuration for other WUS occasions that may not align with WUS occasions of the other UEs. For instance, referring to the Figures, the configuration of the WU-DCI format 500, 550, 650, 850, 851, 852 for at least one UE 104, 350 may differ depending on a periodicity of the WU-DCI or an offset (such as offset 406) between the WU-DCI and the on duration of the UE. For example, referring to FIG. 8, a first configuration for the WU-DCI such as WU-DCI format 850 with three DCI fields may be applied every even 2X ms at WUS occasions 810 and 814, while a second configuration for the WU-DCI such as WU-DCI format 851 with two DCI fields may be applied every odd 2X ms at WUS occasions 812 and 816. Different WU-DCI formats may similarly be applied for different offsets 406.

The configuration may include a WU-DCI configuration for the group of UEs. The WU-DCI configuration may indicate a time-variable configuration of a WU-DCI field. The group-specific WUS may be the WU-DCI. For example, referring to the Figures, the configuration of the WU-DCI format 500, 550, 650, 850, 851, 852 for the group of UEs 104, 350 may indicate a time-variable configuration of one or more of the wake-up information fields in the WU-DCI. For example, referring to FIG. 8, the wake-up information field for UE3 may have a time-variable configuration that changes at different WUS occasions. For instance, the wake-up information field for UE3 may exist at WUS occasions 810 and 814 but may not exist at WUS occasions 812 and 816, or the wake-up information field for UE3 may include wake-up information for UE3 at WUS occasions 810 and 814 but may not include wake-up information for UE3 at WUS occasions 812 and 816 (instead including other WU-DCI content such as a known sequence to help UE1 and/or UE2 decode the WU-DCI at those WUS occasions).

The base station may determine the WU-DCI configuration to include a size for the WU-DCI. For example, referring to the Figures, the base station 102, 310 may determine that the configuration of the WU-DCI format 500, 550, 650, 850, 851, 852 for the group of UEs 104, 350 includes a size for the WU-DCI. For instance, referring to FIG. 8, the base station may determine a size of the WU-DCI, such as three DCI fields for WU-DCI format 850 or two DCI fields for WU-DCI format 851, when configuring the WU-DCI format of the WU-DCI.

The base station may determine the size for the WU-DCI to be a larger size when the time is a first time and a smaller size when the time is a second time. For instance, referring to FIG. 8, the base station may determine the size of the WU-DCI to be three DCI fields (corresponding to WU-DCI format 850) at WUS occasions 810, 814 but two DCI fields (corresponding to WU-DCI format 851) at WUS occasions 812 and 816. Thus, the base station may reduce the size of the WU-DCI based on the time associated with the group-specific WUS, such as removing DCI fields for at least some of the UEs based on a particular WUS occasion at which the WUS is transmitted.

In some examples, the group of UEs may include a first UE having a longer DRX cycle than another UE in the group of UEs. The WU-DCI configuration may include a DCI field for the first UE when a WUS occasion for the first UE is aligned with a WUS occasion for the another UE, and the WU-DCI configuration may omit the DCI field for the first UE when the WUS occasion for the first UE is not aligned with the WUS occasion for the another UE. For example, referring to FIG. 8, UE3 may have a longer DRX cycle (2X ms) than UE1 or UE2 (X ms). Accordingly, WU-DCI format 850 may be configured for UE3 when its WUS occasion is aligned with the WUS occasions of UE1 and UE2 (at WUS occasions 810 and 814). The configuration of the WU-DCI at these times may thus include a DCI field for UE3. On the other hand, WU-DCI format 851 may be configured for UE3 when its WUS occasion is not aligned with the WUS occasions of UE1 and UE2 (at WUS occasions 812 and 816). The configuration of the WU-DCI at these times may thus omit the DCI field for UE3.

In another example, rather than removing the DCI field for first UE, the WU-DCI may indicate a known sequence in that DCI field for the another UE to decode the group-specific WUS when the WUS occasion for the first UE is not aligned with the WUS occasion for the another UE. For example, referring to FIG. 8, WU-DCI format 852 may be configured for the UEs when the WUS occasion of UE3 is not aligned with the WUS occasions of UE1 and UE2 (at WUS occasions 812 and 816). In such case, when a particular UE does not have a WUS occasion that aligns with the WUS, the base station may use the corresponding DCI field to transmit a known sequence that the other UEs in the group may use to assist in decoding their DCI fields from the WUS. For example, referring to the WU-DCI format 852 of FIG. 8, UE1 and UE2 may use the known sequence in the DCI field otherwise used for UE3 to help in the decoding of the wake-up information for UE1 and UE2, respectively.

At 904, the base station determines a value of the one or more time-variable parameters based on a time associated with the group-specific WUS. The determination may be performed, for example, by the determination component 1010 of the apparatus 1002. The time may correspond to at least one of a WUS occasion, a system frame number, or a slot index. For example, referring to the Figures, the base station 102, 310 may determine a value of the WU-DCI size associated with the WU-DCI, such as two DCI fields or three DCI fields, based on the WUS occasion in which the WU-DCI is transmitted. For instance, referring to FIG. 8, the base station may determine the WU-DCI size to be 3 (as represented by WU-DCI format 850) at WUS occasions 810 and 814 and to be 2 (as represented by WU-DCI format 851) at WUS occasions 812 and 816. The base station may similarly determine the WU-DCI content, UE-specific field location in WU-DCI, WU search space configuration, WU-CORESET configuration, TCI state, DMRS mapping type, WU-BWP configuration, UE grouping information, wake-up offset, or other time-variable parameters to be different at different WUS occasions. Likewise, the base station may determine such time-variable parameters to be different for WU-DCIs transmitted in different system frame numbers or slot indices.

At 906, the base station transmits the group-specific WUS to the group of UEs based on the determined value. The transmission may be performed, for example, by the group-specific WUS component 1012 or the transmission component 1006 of the apparatus 1002. For example, the base station may transmit the group-specific WUS, such as the WU-DCI, using the determined value of any of the WU-DCI size or content, location of UE fields within the WU-DCI, WU search space configuration, WU-CORESET configuration, TCI state, DMRS mapping type, WU-BWP configuration, UE grouping information, or wake-up offset.

Figure 10:
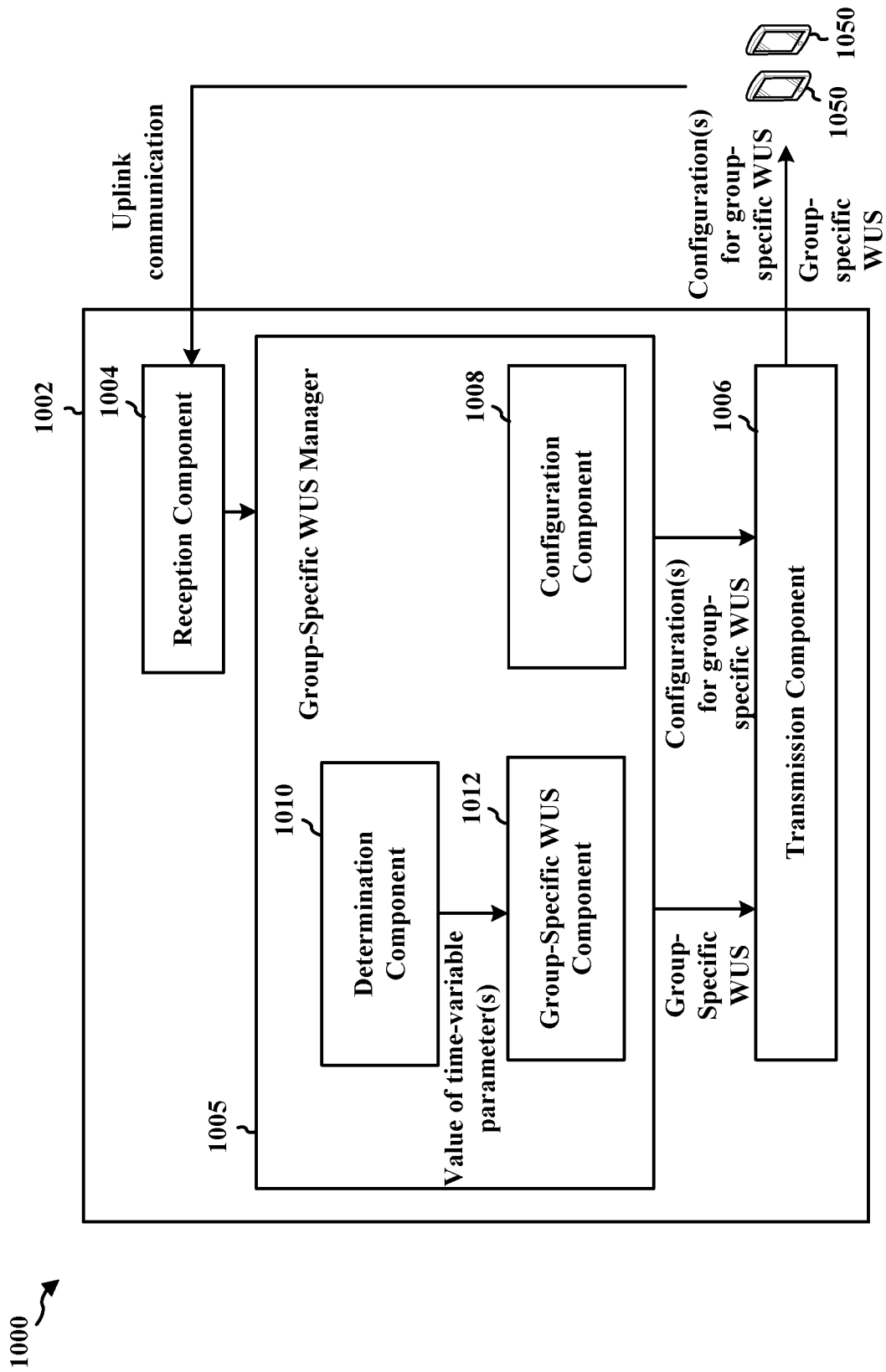
FIG. 10 is a conceptual data flow diagram illustrating the data flow between different components in an example apparatus in accordance with some aspects of the present disclosure.

FIG. 10 is a block diagram of an example apparatus 1000 for wireless communication in accordance with various aspects of the present disclosure. The apparatus 1000 may be a base station, or a base station may include the apparatus 1000. In some aspects, the apparatus 1000 includes a reception component 1002, a group-specific WUS manager 1005, and a transmission component 1006, which may be in communication with one another (for example, via one or more buses). As shown, the apparatus 1000 may communicate with another apparatus 1050 (such as a UE, or another wireless communication device) using the reception component 1002 and the transmission component 1006.

In some aspects, the apparatus 1000 may be configured to perform one or more operations described herein in connection with FIGS. 4-8. Additionally or alternatively, the apparatus 1000 may be configured to perform one or more processes described herein, such as process 900 of FIG. 9, or a combination thereof. In some aspects, the apparatus 1000 may include one or more components of the base station described above in connection with FIG. 3.

The reception component 1002 may receive communications, such as control information, data communications, or a combination thereof, from the apparatus 1050. The reception component 1002 may provide received communications to one or more other components of the apparatus 1000, such as the group-specific WUS manager 1005. In some aspects, the reception component 1002 may perform signal processing on the received communications (such as filtering, amplification, demodulation, analog-to-digital conversion, demultiplexing, deinterleaving, demapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 3.

The transmission component 1006 may transmit communications, such as control information, data communications, or a combination thereof, to the apparatus 1050. In some aspects, the group-specific WUS manager 1005 may generate communications and may transmit the generated communications to the transmission component 1006 for transmission to the apparatus 1050. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1050. In some aspects, the transmission component 1006 may include one or more antennas, a modulator, a transmit MIMO processor, a transmit processor, a controller/processor, a memory, or a combination thereof, of the base station described above in connection with FIG. 3. In some aspects, the transmission component 1006 may be co-located with the reception component 1002 in a transceiver.

The group-specific WUS manager 1005 may receive, or may cause the reception component 1002 to receive, uplink communication from UE(s) 1050. The group-specific WUS manager 1005 may transmit, or may cause the transmission component 1006 to transmit, downlink communication to UE(s) 1050. The group-specific WUS manager 1005 may transmit an indication of a configuration for a group-specific WUS to an associated group of UEs, the configuration indicating one or more time-variable parameters for the group-specific WUS. The group-specific WUS manager 1005 may determine a value of the one or more time-variable parameters based on a time associated with the group-specific WUS. The group-specific WUS manager 1005 may transmit the group-specific WUS to the group of UEs based on the determined value. In some aspects, the group-specific WUS manager 1005 may include a controller/processor, a memory, or a combination thereof, of the base station described above in connection with FIG. 3.

In some aspects, the group-specific WUS manager 1005 may include a set of components, such as a configuration component 1008, a determination component 1010, a group-specific WUS component 1012, or a combination thereof. Alternatively, the set of components may be separate and distinct from the group-specific WUS manager 1005. In some aspects, one or more components of the set of components may include or may be implemented within a controller/processor, a memory, or a combination thereof, of the base station described above in connection with FIG. 3. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 1008 may transmit an indication of a configuration for a group-specific WUS to an associated group of UEs, the configuration indicating one or more time-variable parameters for the group-specific WUS, as described in connection with 902 in FIG. 9. The determination component 1010 may determine a value of the one or more time-variable parameters based on a time associated with the group-specific WUS, as described in connection with 904 in FIG. 9. The group-specific WUS component 1012 may transmit the group-specific WUS to the group of UEs based on the determined value, as described in connection with 906 in FIG. 9.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
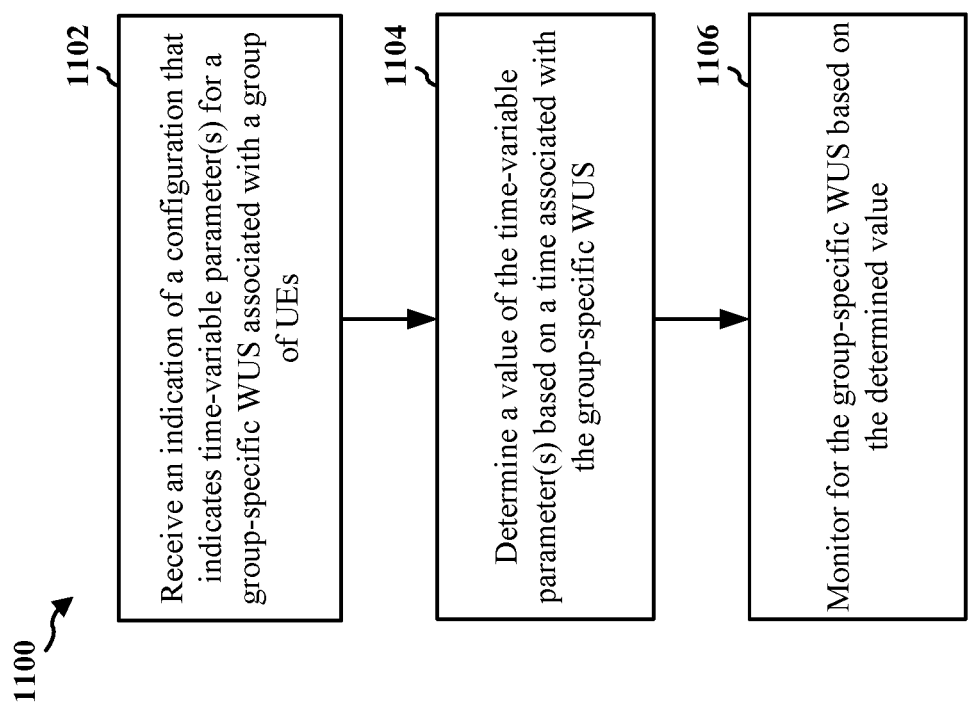
FIG. 11 is a flowchart illustrating a method of wireless communication that supports time-variable WUS parameters in accordance with some aspects of the present disclosure.

FIG. 11 is a flowchart 1100 of a method of wireless communication. The method may be performed by a UE or a component of a UE (such as the UE 104, 350; the apparatus 1202, which may include the memory 360 and which may be the entire UE 350 or a component of the UE 350, such as the TX processor 368, the RX processor 356, or the controller/processor 359). The method may enable a UE to monitor for a group WUS to multiple UEs, even if the group of UEs have different DRX configurations.

At 1102, the UE receives, from a base station, an indication of a configuration for a group-specific WUS associated with a group of UEs including the UE. The configuration indicates one or more time-variable parameters for the group-specific WUS. The reception of the configuration may be performed, for example, by the configuration component 1208 or the reception component 1204 of the apparatus 1202. For example, referring to the Figures, the UE 104, 350 may receive from a base station 102, 310 an indication of a configuration for a WU-DCI (such as one of the WU-DCI formats 500, 550, 650, 850, 851, 852) associated with a group of UEs including the UE 104, 350. The configuration may indicate one or more time-variable parameters for the WU-DCI, including any of a WU-DCI size (such as a number of DCI fields in the WU-DCI among other examples), a WU-DCI content in a DCI field (such as BWP switching information, an A-CSI request, a PDCCH monitoring adaptation, among other examples), a location of a UE-specific field within the WU-DCI, a WU-BWP configuration (such as a frequency allocation for a BWP including the WU-DCI among other examples), a WU-CORESET configuration (such as frequency resources within a BWP including the WU-DCI), a TCI state for a WU-CORESET (such as indicating beams for the WU-DCI transmission among other examples), a DMRS mapping type (such as a narrowband DMRS or a wideband DMRS associated with the WU-DCI), a wake-up search space configuration (such as an aggregation level of the WU-DCI and a number of candidates, a monitoring occasion location within a slot for the WU-DCI, a monitoring duration in a slot for the WU-DCI, among other examples), a UE group (such as a value of a group-specific RNTI, a PS-RNTI, among other examples), or a wake-up offset value for the wake-up offset between a WUS occasion and an on duration of the UE.

At 1104, the UE determines a value of the one or more time-variable parameters based on a time associated with the group-specific WUS. The determination may be performed, for example, by the determination component 1210 of the apparatus 1202. The time may correspond to at least one of a WUS occasion, a system frame number, or a slot index. For example, referring to the Figures, the UE 104, 350 may determine a value of the WU-DCI size associated with the WU-DCI, such as two DCI fields or three DCI fields, based on the WUS occasion in which the WU-DCI is received. For instance, referring to FIG. 8, the UE may determine the WU-DCI size to be 3 (as represented by WU-DCI format 850) at WUS occasions 810 and 814 and to be 2 (as represented by WU-DCI format 851) at WUS occasions 812 and 816. The UE may similarly determine the WU-DCI content, UE-specific field location in WU-DCI, WU search space configuration, WU-CORESET configuration, TCI state, DMRS mapping type, WU-BWP configuration, UE grouping information, wake-up offset, or other time-variable parameters to be different at different WUS occasions. Likewise, the UE may determine such time-variable parameters to be different for WU-DCIs received in different system frame numbers or slot indices.

The configuration may indicate a sequence of time-variable parameters for the UE. For example, the UE may receive WUS parameters to be applied when the UE is operating using a short DRX cycle and other WUS parameters to be applied when the UE in operating using a long DRX cycle. The sequence may include a first time-variable parameter associated with a shorter DRX cycle length of the UE and a second time-variable parameter associated with a longer DRX cycle length of the UE. For example, referring to the Figures, the configuration of the WU-DCI format 500, 550, 650, 850, 851, 852 for at least one UE 104, 350 may indicate a sequence of different WU-DCI sizes for the WU-DCI, including a first WU-DCI size associated with shorter DRX cycle lengths and a second WU-DCI size associated with longer DRX cycle lengths. For instance, referring to FIG. 8, the configuration may indicate a sequence of DCI sizes: (2, 3), corresponding to DCI format 851 with two DCI fields for 2X ms (longer) DRX cycles and DCI format 850 with three DCI fields for X ms (shorter) DRX cycles. Accordingly in this example, the WU-DCI may include two DCI fields for shorter cycles and three fields for longer cycles. In other examples, the configuration may indicate a sequence of different WU-DCI contents, UE-specific field locations, or other time-variable parameters depending on DRX cycle length. Thus, the UE may receive different WUS parameters to use in different WUS occasions.

The configuration may include a first WUS configuration and a second WUS configuration for the UE, the first WUS configuration having at least one of a first periodicity or a first offset parameter and the second WUS configuration having at least one of a second periodicity or a second offset parameter different than the first periodicity or the first offset parameter, respectively. For example, the UE may operate using a shorter DRX cycle than another UE in the group of UEs. The UE may receive a first WUS configuration for WUS occasions that may align with the DRX occasion of at least some of the other UEs, such as UEs having a long DRX cycle, and a second WUS configuration for other WUS occasions that may not align with WUS occasions of the other UEs. For instance, referring to the Figures, the configuration of the WU-DCI format 500, 550, 650, 850, 851, 852 for at least one UE 104, 350 may differ depending on a periodicity of the WU-DCI or an offset (such as offset 406) between the WU-DCI and the on duration of the UE. For example, referring to FIG. 8, a first configuration for the WU-DCI such as WU-DCI format 850 with three DCI fields may be applied every even 2X ms at WUS occasions 810 and 814, while a second configuration for the WU-DCI such as WU-DCI format 851 with two DCI fields may be applied every odd 2X ms at WUS occasions 812 and 816. Different WU-DCI formats may similarly be applied for different offsets 406.

The configuration may include a WU-DCI configuration for the group of UEs. The WU-DCI configuration may indicate a time-variable configuration of a WU-DCI field. The group-specific WUS may be the WU-DCI. For example, referring to the Figures, the configuration of the WU-DCI format 500, 550, 650, 850, 851, 852 for the group of UEs 104, 350 may indicate a time-variable configuration of one or more of the wake-up information fields in the WU-DCI. For example, referring to FIG. 8, the wake-up information field for UE3 may have a time-variable configuration that changes at different WUS occasions. For instance, the wake-up information field for UE3 may exist at WUS occasions 810 and 814 but may not exist at WUS occasions 812 and 816, or the wake-up information field for UE3 may include wake-up information for UE3 at WUS occasions 810 and 814 but may not include wake-up information for UE3 at WUS occasions 812 and 816 (instead including other WU-DCI content such as a known sequence to help UE1 and/or UE2 decode the WU-DCI at those WUS occasions).

The UE may determine the WU-DCI configuration to include a size for the WU-DCI. For example, referring to the Figures, the UE 104, 350 may determine that the configuration of the WU-DCI format 500, 550, 650, 850, 851, 852 for the group of UEs includes a size for the WU-DCI. For instance, referring to FIG. 8, the UE may determine a size of the WU-DCI, such as three DCI fields for WU-DCI format 850 or two DCI fields for WU-DCI format 851, after receiving the configuration of the WU-DCI format of the WU-DCI. Thus, in some WUS occasions, the WU-DCI may include more DCI fields or less DCI fields.

The UE may determine the size for the WU-DCI to be a larger size when the time is a first time and a smaller size when the time is a second time. For instance, referring to FIG. 8, the UE may determine the size of the WU-DCI to be three DCI fields (corresponding to WU-DCI format 850) at WUS occasions 810, 814 but two DCI fields (corresponding to WU-DCI format 851) at WUS occasions 812 and 816. Thus, the base station may reduce the size of the WU-DCI based on the time associated with the group-specific WUS, such as removing a DCI field for one of the other UEs based on a particular WUS occasion at which the WUS is transmitted, such as another UE having a longer DRX cycle than the UE.

In some examples, the UE may have a shorter DRX cycle than another UE in the group of UEs. The WU-DCI configuration may include a DCI field for the another UE when a WUS occasion for the another UE is aligned with a WUS occasion for the UE, and the WU-DCI configuration may omit the DCI field for the another UE when the WUS occasion for the another UE is not aligned with the WUS occasion for the UE. For example, referring to FIG. 8, UE3 may have a longer DRX cycle (2X ms) than UE1 or UE2 (X ms). Accordingly, WU-DCI format 850 may be configured for UE3 when its WUS occasion is aligned with the WUS occasions of UE1 and UE2 (at WUS occasions 810 and 814). The configuration of the WU-DCI at these times may thus include a DCI field for UE3. On the other hand, WU-DCI format 851 may be configured for UE3 when its WUS occasion is not aligned with the WUS occasions of UE1 and UE2 (at WUS occasions 812 and 816). The configuration of the WU-DCI at these times may thus omit the DCI field for UE3.

In another example, rather than removing a DCI field for the another UE, the WU-DCI may indicate a known sequence in that DCI field, and the UE may use the known sequence to assist decoding of the WU-DCI when the WUS occasion for the another UE is not aligned with the WUS occasion for the UE. For example, referring to FIG. 8, WU-DCI format 852 may be configured for the UEs when the WUS occasion of UE3 is not aligned with the WUS occasions of UE1 and UE2 (at WUS occasions 812 and 816), and UE1 and UE2 may use the known sequence in the DCI field otherwise used for UE3 to help in the decoding of the wake-up information for UE1 and UE2, respectively.

The one or more time-variable parameters may be for a group of UEs that includes the UE. Alternatively, the one or more time-variable parameters may be specific to the UE.

At 1106, the UE monitors for the group-specific WUS based on the determined value. In some examples, the group-specific WUS monitor component 1212 of the apparatus 1202 may monitor for the group-specific WUS using the value of the time-variable parameters determined by the determination component 1202. For example, the UE may monitor for the group-specific WUS, such as the WU-DCI, using the determined value of any of the WU-DCI size or content, location of UE fields within the WU-DCI, WU search space configuration, WU-CORESET configuration, TCI state, DMRS mapping type, WU-BWP configuration, UE grouping information, or wake-up offset.

Figure 12:
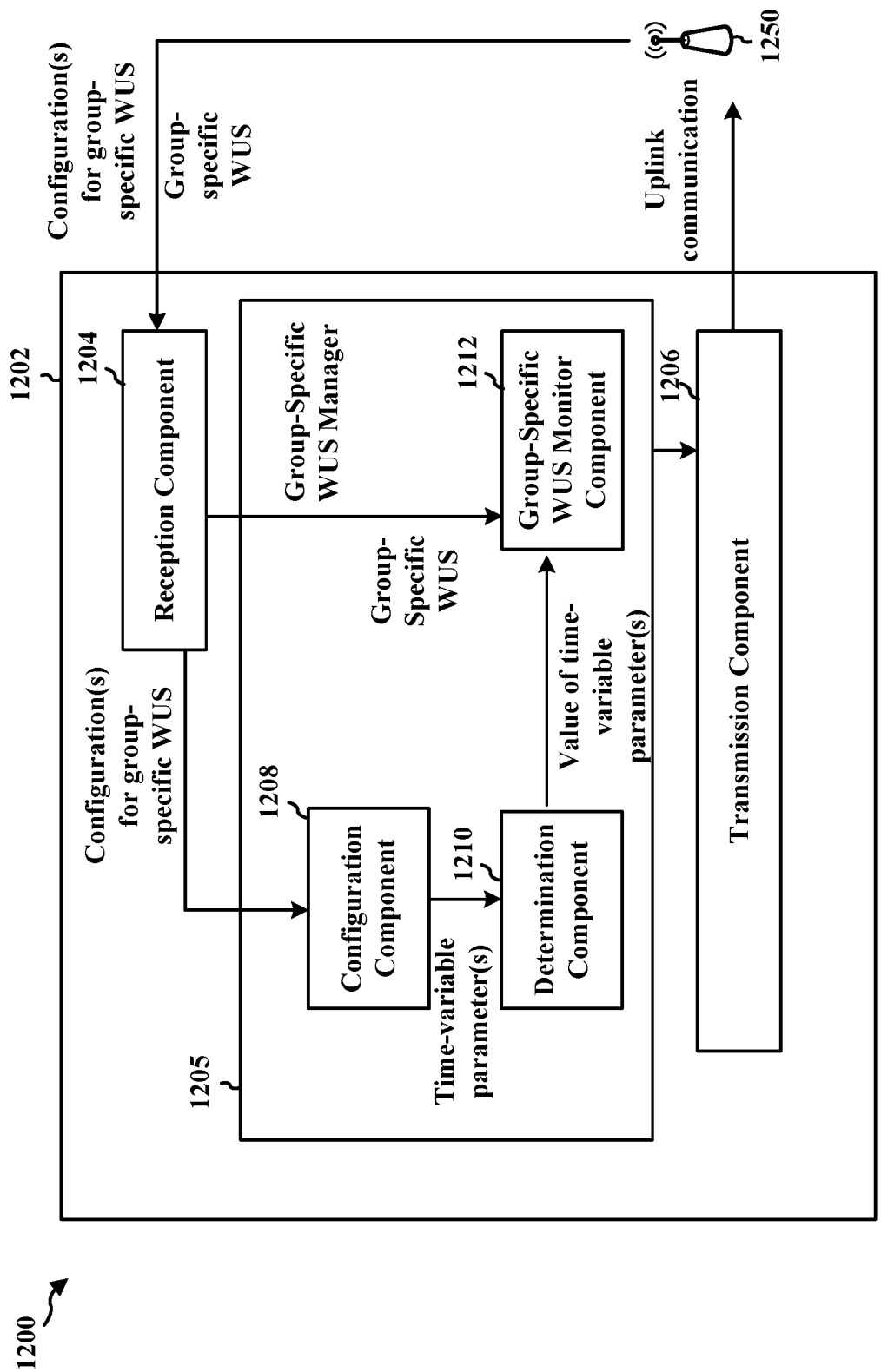
FIG. 12 is a conceptual data flow diagram illustrating the data flow between different components in an example apparatus in accordance with some aspects of the present disclosure.

FIG. 12 is a block diagram of an example apparatus 1200 for wireless communication in accordance with various aspects of the present disclosure. The apparatus 1200 may be a UE, or a UE may include the apparatus 1200. In some aspects, the apparatus 1200 includes a reception component 1202, a group-specific WUS manager 1205, and a transmission component 1206, which may be in communication with one another (for example, via one or more buses). As shown, the apparatus 1200 may communicate with another apparatus 1250 (such as a base station, or another wireless communication device) using the reception component 1202 and the transmission component 1206.

In some aspects, the apparatus 1200 may be configured to perform one or more operations described herein in connection with FIGS. 4-8. Additionally or alternatively, the apparatus 1200 may be configured to perform one or more processes described herein, such as process 1100 of FIG. 11, or a combination thereof. In some aspects, the apparatus 1200 may include one or more components of the UE described above in connection with FIG. 3.

The reception component 1202 may receive communications, such as control information, data communications, or a combination thereof, from the apparatus 1250. The reception component 1202 may provide received communications to one or more other components of the apparatus 1200, such as the group-specific WUS manager 1205. In some aspects, the reception component 1202 may perform signal processing on the received communications (such as filtering, amplification, demodulation, analog-to-digital conversion, demultiplexing, deinterleaving, demapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the UE described above in connection with FIG. 3.

The transmission component 1206 may transmit communications, such as control information, data communications, or a combination thereof, to the apparatus 1250. In some aspects, the group-specific WUS manager 1205 may generate communications and may transmit the generated communications to the transmission component 1206 for transmission to the apparatus 1250. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1250. In some aspects, the transmission component 1206 may include one or more antennas, a modulator, a transmit MIMO processor, a transmit processor, a controller/processor, a memory, or a combination thereof, of the UE described above in connection with FIG. 3. In some aspects, the transmission component 1206 may be co-located with the reception component 1202 in a transceiver.

The group-specific WUS manager 1205 may receive, or may cause the reception component 1202 to receive, downlink communication from base station 1250. The group-specific WUS manager 1205 may transmit, or may cause the transmission component 1206 to transmit, uplink communication to base station 1250. The group-specific WUS manager 1205 may receive an indication of a configuration for a group-specific WUS associated with a group of UEs including the UE, the configuration indicating one or more time-variable parameters for the group-specific WUS. The group-specific WUS manager 1205 may determine a value of the one or more time-variable parameters based on a time associated with the group-specific WUS. The group-specific WUS manager 1205 may monitor for the group-specific WUS based on the determined value. In some aspects, the group-specific WUS manager 1205 may include a controller/processor, a memory, or a combination thereof, of the UE described above in connection with FIG. 3.

In some aspects, the group-specific WUS manager 1205 may include a set of components, such as a configuration component 1208, a determination component 1210, a group-specific WUS monitor component 1212, or a combination thereof. Alternatively, the set of components may be separate and distinct from the group-specific WUS manager 1205. In some aspects, one or more components of the set of components may include or may be implemented within a controller/processor, a memory, or a combination thereof, of the UE described above in connection with FIG. 3. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 1208 may receive an indication of a configuration for a group-specific WUS associated with a group of UEs including the UE, the configuration indicating one or more time-variable parameters for the group-specific WUS, as described in connection with 1102 in FIG. 11. The determination component 1210 may determine a value of the one or more time-variable parameters based on a time associated with the group-specific WUS, as described in connection with 1104 in FIG. 11. The group-specific WUS monitor component 1212 may monitor for the group-specific WUS based on the determined value, as described in connection with 1106 in FIG. 11.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network entity, comprising:
    transmitting an indication of a configuration for a group-specific wake-up signal (WUS) to an associated group of user equipment (UEs), the configuration indicating one or more time-variable parameters for the group-specific WUS, a value of the one or more time-variable parameters being different for different WUS occasions of the group-specific WUS, wherein the associated group of UEs includes a first UE having a longer DRX cycle than a second UE in the group of UEs and the configuration includes:

a first time-variable parameter for the first UE for a first WUS occasion of the first UE that aligns with the second UE, and a second time-variable parameter that is different than the first time-variable parameter for a second WUS occasion that does not align with the second UE; and transmitting, in a WUS occasion, the group-specific WUS to the associated group of UEs using the value of the one or more time-variable parameters based on a time associated with the WUS occasion of the group-specific WUS.

2. The method of claim 1, wherein the time corresponds to at least one of:
the WUS occasion,
a system frame number, or
a slot index.

3. The method of claim 1, wherein the one or more time-variable parameters include at least one of:
a wake-up downlink control information (WU-DCI) size,
a WU-DCI content,
a location of a UE-specific field within a WU-DCI,
a wake-up bandwidth part (WU-BWP) configuration,
a wake-up control resource set (WU-CORESET) configuration,
a transmission configuration indication (TCI) state for a WU-CORESET,
a demodulation reference signal (DMRS) mapping type,
a wake-up search space configuration,
a UE group, or
a wake-up offset.

4. The method of claim 1, wherein the configuration indicates a sequence of time-variable parameters for at least one UE from the associated group of UEs, the sequence including a third time-variable parameter associated with a shorter discontinuous reception (DRX) cycle length of the at least one UE and a fourth time-variable parameter associated with a longer DRX cycle length of the at least one UE.

5. The method of claim 1, wherein the configuration includes a first WUS configuration and a second WUS configuration for at least one UE from the associated group of UEs, the first WUS configuration having at least one of a first periodicity or a first offset parameter and the second WUS configuration having at least one of a second periodicity or a second offset parameter different than the first periodicity or the first offset parameter, respectively.

6. The method of claim 1, wherein the configuration includes a wake-up downlink control information (WU-DCI) configuration for the associated group of UEs, wherein the WU-DCI configuration indicates a time-variable configuration of a WU-DCI field, and wherein the group-specific WUS comprises the WU-DCI.

7. The method of claim 6, further comprising determining the WU-DCI configuration to include a size for the WU-DCI.

8. The method of claim 7, further comprising determining the size for the WU-DCI based on the time.

9. The method of claim 7, wherein the WU-DCI configuration includes a DCI field for the first UE when WUS occasions for the first UE and the second UE being aligned, and wherein the WU-DCI configuration omits the DCI field for the first UE when the WUS occasions for the first UE and the second UE are not aligned.

10. The method of claim 9, wherein the WU-DCI indicates a known sequence in the DCI field for the second UE to decode the group-specific WUS when the WUS occasions for the first UE and the second UE are not aligned.

11. A method of wireless communication at a user equipment (UE), comprising:
receiving, from a network entity, an indication of a configuration for a group-specific wake-up signal (WUS) associated with a group of UEs including the UE, the configuration indicating one or more time-variable parameters for the group-specific WUS, a value of the one or more time-variable parameters being different for different WUS occasions of the group-specific WUS, wherein the group of UEs includes a first UE having a longer DRX cycle than a second UE in the group of UEs and the configuration includes:
a first time-variable parameter for the first UE for a first WUS occasion of the first UE that aligns with the second UE, and
a second time-variable parameter that is different than the first time-variable parameter for a second WUS occasion that does not align with the second UE; and
monitoring, in a WUS occasion, for the group-specific WUS using the value of the one or more time-variable parameters based on a time associated with the WUS occassion of the group-specific WUS.

12. The method of claim 11, wherein the time corresponds to at least one of:
the WUS occasion,
a system frame number, or
a slot index.

13. The method of claim 11, wherein the one or more time-variable parameters include at least one of:
a wake-up downlink control information (WU-DCI) size,
a WU-DCI content,
a location of a UE-specific field within a WU-DCI,
a wake-up bandwidth part (WU-BWP) configuration,
a wake-up control resource set (WU-CORESET) configuration,
a transmission configuration indication (TCI) state for a WU-CORESET,
a demodulation reference signal (DMRS) mapping type,
a wake-up search space configuration,
a UE group, or
a wake-up offset.

14. The method of claim 11, wherein the configuration indicates a sequence of time-variable parameters for the UE, the sequence including a third time-variable parameter associated with a shorter discontinuous reception (DRX) cycle length of the UE and a fourth time-variable parameter associated with a longer DRX cycle length of the UE.

15. The method of claim 11, wherein the configuration includes a first WUS configuration and a second WUS configuration for the UE, the first WUS configuration having at least one of a first periodicity or a first offset parameter and the second WUS configuration having at least one of a second periodicity or a second offset parameter different than the first periodicity or the first offset parameter, respectively.

16. The method of claim 11, wherein the configuration includes a wake-up downlink control information (WU-DCI) configuration for the group of UEs, wherein the WU-DCI configuration indicates a time-variable configuration of a WU-DCI field, and wherein the group-specific WUS comprises a WU-DCI.

17. The method of claim 16, further comprising determining the WU-DCI configuration to include a size for the WU-DCI.

18. The method of claim 16, wherein the UE is the first UE that has a shorter DRX cycle than the second UE in the group of UEs, wherein the WU-DCI configuration includes a DCI field for the second UE when WUS occasions for the first UE and the second UE are aligned, and wherein the WU-DCI configuration omits the DCI field for the second UE when the WUS occasions for the first UE and the second UE are not aligned.

19. The method of claim 18, wherein the WU-DCI indicates a known sequence in the DCI field for the second UE, the method further comprising:
using the known sequence to assist decoding of the WU-DCI when the WUS occasions for the first UE and the second UE are not aligned.

20. The method of claim 11, wherein the one or more time-variable parameters are for the group of UEs that includes the UE or are specific to the UE.

21. An apparatus for wireless communication at a network entity, comprising:
a memory; and
at least one processor coupled to the memory and configured to:
transmit an indication of a configuration for a group-specific wake-up signal (WUS) to an associated group of user equipment (UEs), the configuration indicating one or more time-variable parameters for the group-specific WUS, a value of the one or more time-variable parameters being different for different WUS occasions of the group-specific WUS, wherein the associated group of UEs includes a first UE having a longer DRX cycle than a second UE in the associated group of UEs and the configuration includes:
a first time-variable parameter for the first UE for a first WUS occasion of the first UE that aligns with the second UE, and
a second time-variable parameter that is different than the first time-variable parameter for a second WUS occasion that does not align with the second UE; and
transmit, in a WUS occasion, the group-specific WUS to the associated group of UEs using the value of the one or more time-variable parameters based on a time associated with the WUS occasion of the group-specific WUS.

22. The apparatus of claim 21, wherein the configuration indicates a sequence of time-variable parameters for at least one UE from the associated group of UEs, the sequence including a third time-variable parameter associated with a shorter discontinuous reception (DRX) cycle length of the at least one UE and a fourth time-variable parameter associated with a longer DRX cycle length of the at least one UE.

23. The apparatus of claim 21, wherein the configuration includes a first WUS configuration and a second WUS configuration for at least one UE from the associated group of UEs, the first WUS configuration having at least one of a first periodicity or a first offset parameter and the second WUS configuration having at least one of a second periodicity or a second offset parameter different than the first periodicity or the first offset parameter, respectively.

24. The apparatus of claim 21, wherein the configuration includes a wake-up downlink control information (WU-DCI) configuration for the associated group of UEs, wherein the WU-DCI configuration indicates a time-variable configuration of a WU-DCI field, and wherein the group-specific WUS comprises a WU-DCI.

25. The apparatus of claim 24, further comprising determining the WU-DCI configuration to include a size for the WU-DCI.

26. An apparatus for wireless communication at a user equipment (UE), comprising:
a memory; and
at least one processor coupled to the memory and configured to:
receive, from a network entity, an indication of a configuration for a group-specific wake-up signal (WUS) associated with a group of UEs including the UE, the configuration indicating one or more time-variable parameters for the group-specific WUS, a value of the one or more time-variable parameters being different for different WUS occasions of the group-specific WUS, wherein the group of UEs includes a first UE having a longer DRX cycle than a second UE in the group of UEs and the configuration includes:
a first time-variable parameter for the first UE for a first WUS occasion of the first UE that aligns with the second UE, and
a second time-variable parameter that is different than the first time-variable parameter for a second WUS occasion that does not align with the second UE; and
monitor, in a WUS occasion, for the group-specific WUS using the value of the one or more time-variable parameters based on a time associated with the WUS occasion of the group-specific WUS.

27. The apparatus of claim 26, wherein the configuration indicates a sequence of time-variable parameters for the UE, the sequence including a third time-variable parameter associated with a shorter discontinuous reception (DRX) cycle length of the UE and a fourth time-variable parameter associated with a longer DRX cycle length of the UE.

28. The apparatus of claim 26, wherein the configuration includes a first WUS configuration and a second WUS configuration for the UE, the first WUS configuration having at least one of a first periodicity or a first offset parameter and the second WUS configuration having at least one of a second periodicity or a second offset parameter different than the first periodicity or the first offset parameter, respectively.

29. The apparatus of claim 26, wherein the configuration includes a wake-up downlink control information (WU-DCI) configuration for the group of UEs, wherein the WU-DCI configuration indicates a time-variable configuration of a WU-DCI field, and wherein the group-specific WUS comprises a WU-DCI.

30. The apparatus of claim 29, further comprising determining the WU-DCI configuration to include a size for the WU-DCI.

31. The method of claim 1, further comprising:
determining the value of the one or more time-variable parameters based on the time associated with the WUS occasion of the group-specific WUS.

32. The method of claim 11, further comprising:
determining the value of the one or more time-variable parameters based on the time associated with the WUS occasion of the group-specific WUS.

33. The apparatus of claim 21, wherein the at least one processor is further configured to:
determine the value of the one or more time-variable parameters based on the time associated with the WUS occasion of the group-specific WUS.

34. The apparatus of claim 26, wherein the at least one processor is further configured to:

determine the value of the one or more time-variable parameters based on the time associated with the WUS occasion of the group-specific WUS.

* * * * *